United States Patent
Gagliardi et al.

(10) Patent No.: US 8,782,612 B2
(45) Date of Patent: Jul. 15, 2014

(54) FAILSAFE MECHANISM FOR DYNAMIC INSTRUMENTATION OF SOFTWARE USING CALLBACKS

(75) Inventors: Marco Gagliardi, Brisbane, CA (US); Yitao Sun, Taipei (TW)

(73) Assignee: CA, Inc., Islandia, NY (US)

( * ) Notice: Subject to any disclaimer, the term of this patent is extended or adjusted under 35 U.S.C. 154(b) by 489 days.

(21) Appl. No.: 12/777,506

(22) Filed: May 11, 2010

(65) Prior Publication Data

US 2011/0283265 A1 Nov. 17, 2011

(51) Int. Cl.
- G06F 9/44 (2006.01)
- G06F 9/45 (2006.01)
- G06F 11/34 (2006.01)
- G06F 11/36 (2006.01)
- G06F 11/14 (2006.01)

(52) U.S. Cl.
CPC ........ *G06F 11/3644* (2013.01); *G06F 11/3495* (2013.01); *G06F 11/1438* (2013.01); *G06F 2201/875* (2013.01)
USPC ............ 717/130; 717/133; 717/153; 717/158

(58) Field of Classification Search
CPC ............ G06F 11/3644; G06F 11/3495; G06F 11/1438; G06F 2201/875
See application file for complete search history.

(56) References Cited

U.S. PATENT DOCUMENTS

| | | | |
|---|---|---|---|
| 5,689,709 A | 11/1997 | Corbett et al. | |
| 6,470,494 B1 | 10/2002 | Chan et al. | |
| 6,985,909 B2 | 1/2006 | Blohm | |
| 7,017,155 B2 | 3/2006 | Peev et al. | |
| 7,058,957 B1 | 6/2006 | Nguyen | |
| 7,206,807 B2 | 4/2007 | Cheenath | |
| 7,293,260 B1 | 11/2007 | Dmitriev | |
| 7,398,533 B1 | 7/2008 | Slaughter et al. | |
| 7,437,359 B2 | 10/2008 | Aguilar-Macias et al. | |
| 7,469,262 B2 | 12/2008 | Baskaran et al. | |
| 7,483,927 B2 | 1/2009 | Anglin et al. | |
| 7,546,593 B2 | 6/2009 | Petev et al. | |

(Continued)

FOREIGN PATENT DOCUMENTS

WO 2009/095741 A1 8/2009

OTHER PUBLICATIONS

Marek Olszewski, JIT Instrumentation—A Novel Approach to Dynamically Instrument Operating Systems, 2007, pp. 1-11.*

(Continued)

*Primary Examiner* — Thuy Dao
*Assistant Examiner* — Mongbao Nguyen
(74) *Attorney, Agent, or Firm* — Vierra Magen Marcus LLP

(57) ABSTRACT

A failsafe mechanism for installing and removing temporary instrumentation during a runtime of an application. Initially, an application is configured with a baseline set of instrumented components such as methods. Additional instrumentation is then deployed in the application, such as to diagnose a performance problem. The failsafe mechanism ensures that the additional instrumentation is automatically removed, even when there is an interruption in a communication link to the application, a computing device failure, a software failure, or some other type of failure, which renders it impossible to manually roll back the instrumentation from a remote user interface. The failsafe mechanism can be provided using callbacks between the computing devices which detect when a connection is unexpectedly lost or closed. Termination of one callback can cascade to one or more other callbacks. The instrumentation rollback can involve reloading un-instrumented byte code of the application.

17 Claims, 16 Drawing Sheets

(56) References Cited

U.S. PATENT DOCUMENTS

| | | | |
|---|---|---|---|
| 7,571,427 B2 | 8/2009 | Wang et al. | |
| 7,603,664 B2* | 10/2009 | Dutt et al. | 717/153 |
| 7,614,045 B2 | 11/2009 | Kuck et al. | |
| 8,245,210 B2* | 8/2012 | Ng et al. | 717/153 |
| 8,359,582 B2* | 1/2013 | Elliott | 717/130 |
| 8,555,259 B2* | 10/2013 | Krauss | 717/133 |
| 2002/0199172 A1 | 12/2002 | Bunnell | |
| 2003/0088854 A1* | 5/2003 | Wygodny et al. | 717/130 |
| 2003/0115584 A1 | 6/2003 | Fahs et al. | |
| 2003/0135847 A1* | 7/2003 | Gouriou et al. | 717/158 |
| 2003/0149960 A1 | 8/2003 | Inamdar | |
| 2003/0163608 A1 | 8/2003 | Tiwary et al. | |
| 2004/0078691 A1 | 4/2004 | Cirne et al. | |
| 2004/0133882 A1* | 7/2004 | Angel et al. | 717/130 |
| 2004/0163077 A1 | 8/2004 | Dimpsey et al. | |
| 2004/0230956 A1 | 11/2004 | Cirne et al. | |
| 2005/0039172 A1 | 2/2005 | Rees et al. | |
| 2005/0240858 A1 | 10/2005 | Croft et al. | |
| 2005/0261879 A1 | 11/2005 | Shrivastava et al. | |
| 2005/0273667 A1 | 12/2005 | Shrivastava et al. | |
| 2005/0273787 A1 | 12/2005 | Kovachka-Dimitrova et al. | |
| 2006/0174226 A1 | 8/2006 | Fair et al. | |
| 2006/0218533 A1 | 9/2006 | Koduru et al. | |
| 2007/0150870 A1 | 6/2007 | Fitch et al. | |
| 2007/0168998 A1 | 7/2007 | Mehta et al. | |
| 2007/0234307 A1 | 10/2007 | Luk et al. | |
| 2007/0283331 A1* | 12/2007 | Pietrek | 717/130 |
| 2008/0005726 A1* | 1/2008 | Collard | 717/153 |
| 2008/0034352 A1 | 2/2008 | McKinney et al. | |
| 2008/0148242 A1 | 6/2008 | Cobb et al. | |
| 2008/0222614 A1 | 9/2008 | Chilimbi et al. | |
| 2008/0276227 A1 | 11/2008 | Greifeneder | |
| 2008/0288212 A1 | 11/2008 | Greifeneder | |
| 2008/0288962 A1* | 11/2008 | Greifeneder et al. | 719/317 |
| 2009/0013210 A1* | 1/2009 | McIntosh et al. | 714/4 |
| 2009/0106746 A1* | 4/2009 | Chaudhuri et al. | 717/158 |
| 2009/0112667 A1 | 4/2009 | Blackwell et al. | |
| 2009/0138858 A1* | 5/2009 | Livshits et al. | 717/130 |
| 2009/0144305 A1 | 6/2009 | Little | |
| 2009/0254889 A1 | 10/2009 | Prasadarao | |
| 2009/0271769 A1* | 10/2009 | Krauss | 717/133 |
| 2009/0282125 A1* | 11/2009 | Jeide et al. | 709/217 |
| 2009/0320045 A1 | 12/2009 | Griffith et al. | |
| 2010/0037211 A1* | 2/2010 | Zakonov et al. | 717/130 |
| 2010/0131930 A1 | 5/2010 | Ben-Chaim et al. | |
| 2010/0153939 A1* | 6/2010 | Stall et al. | 717/158 |
| 2010/0257603 A1* | 10/2010 | Chander et al. | 726/22 |
| 2011/0138368 A1* | 6/2011 | Krauss | 717/133 |
| 2011/0231819 A1 | 9/2011 | Tanner et al. | |
| 2013/0145349 A1 | 6/2013 | Basak et al. | |
| 2013/0179868 A1 | 7/2013 | Greifeneder et al. | |

OTHER PUBLICATIONS

Christian Thiffault, Dynamic Instrumentation of Large-Scale MPI and OpenMP Applications, 2003, pp. 1-7.*

Nicholas Nethercote, Dynamic binary analysis and instrumentation, 2004, pp. 11-13 and 17-31.*

Extended European Search Report dated Dec. 19, 2011, European Patent Application No. 11250847.8.

U.S. Appl. No. 12/777,490, filed May 11, 2010.

U.S. Appl. No. 12/777,496, filed May 11, 2010.

Dmitriev, "Design of JFluid: A Profiling Technology and Tool Based on Dynamic Bytecode Instrumentation", SMLI TR-2003-125, Nov. 17, 2003, Sun Microsystems, Inc, pp. 1-19.

Binder et al., "Advanced Java Bytecode Instrumentation", PPPJ 2007, Sep. 5-7, 2007, Lisboa, Portugal. Copyright 2007 ACM.

Repsonse to Extended European Search Report dated May 16, 2012, European Patent Application No. 11250521.9.

Extended European Search Report dated Aug. 16, 2011, European Patent Application No. 11250520.1-1225.

Morajko et al., "Design and implementation of a dynamic tuning environment," Journal of Parallel and Distributed Computing, vol. 67, No. 4, Mar. 24, 2007, pp. 474-490.

Extended European Search Report dated Sep. 1, 2011, European Patent Application No. 11250522.7-1225.

Extended European Search Report dated Sep. 19, 2011, European Patent Application No. 11250521.9-1225.

Response to Search Opinion dated Sep. 5, 2012, European Patent Application No. 11250520.1-1225.

Response to Search Opinion dated Oct. 16, 2012, European Patent Application No. 11250847.8.

Response to the Search Opinion of the Extended European Search Report dated Oct. 28, 2011, European Patent Application No. 11250522.7.

U.S. Appl. No. 12/903,102, filed Oct. 12, 2010.

Non-Final Office Action dated Dec. 6, 2012, U.S. Appl. No. 12/777,490, filed May 11, 2010.

Non-Final Office Action dated Dec. 28, 2012, U.S. Appl. No. 12/777,496, filed May 11, 2010.

Non-Final Office Action dated Jan. 17, 2013, U.S. Appl. No. 12/903,102, filed Oct. 12, 2010.

Mirgorodskiy, Alexander V., et al., "CrossWalk: A tool for performance profiling across the user-kernel boundary," Advances in Parallel Computing, vol. 13, 2004, pp. 745-752.

Response to Office Action dated Mar. 6, 2013, U.S. Appl. No. 12/777,490, filed May 11, 2010.

Notice of Allowance and Fee(s) Due dated Mar. 19, 2013, U.S. Appl. No. 12/777,490, filed May 11, 2010.

Response to Office Action dated Mar. 27, 2013, U.S. Appl. No. 12/777,496, filed May 11, 2010.

Response to Office Action dated Apr. 17, 2013, U.S. Appl. No. 12/903,102, filed Oct. 12, 2010.

Final Office Action dated Aug. 15, 2013, U.S. Appl. No. 12/903,102, filed Oct. 12, 2010.

Non-final Office Action dated Oct. 1, 2013, U.S. Appl. No. 13/310,986, filed Dec. 5, 2011.

Response to Office Action dated Oct. 14, 2013, European Patent Application No. 11250847.8.

Response to Final Office Action dated Nov. 15, 2013, U.S. Appl. No. 12/903,102, filed Oct. 12, 2010.

European Office Action dated Jun. 12, 2013, European Patent Application No. 11 250 847.8-1951.

Notice of Allowance and Fee(s) Due dated Jun. 25, 2013, U.S. Appl. No. 12/777,496, filed May 11, 2010.

Notice of Allowance dated Feb. 28, 2014, U.S. Appl. No. 13/310,986, filed Dec. 5, 2011.

Response to Office Action dated Jan. 2, 2014, U.S. Appl. No. 13/310,986, filed Dec. 5, 2011.

Non-final Office Action dated Apr. 24, 2014, U.S. Appl. No. 12/903,102, filed Oct. 12, 2010.

* cited by examiner

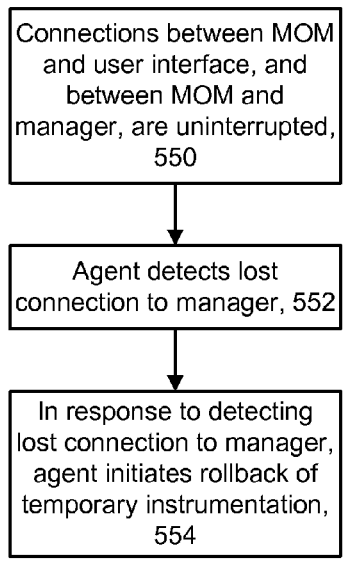

Fig. 5E

Connections between MOM and user interface, and between MOM and manager, are uninterrupted, 550

↓

Agent detects lost connection to manager, 552

↓

In response to detecting lost connection to manager, agent initiates rollback of temporary instrumentation, 554

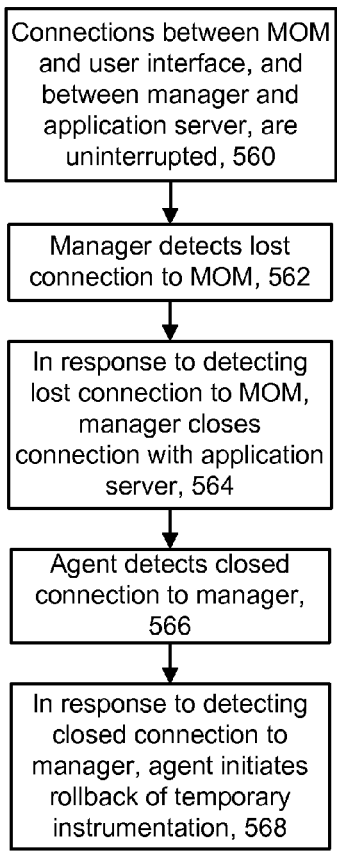

Fig. 5F

Connections between MOM and user interface, and between manager and application server, are uninterrupted, 560

↓

Manager detects lost connection to MOM, 562

↓

In response to detecting lost connection to MOM, manager closes connection with application server, 564

↓

Agent detects closed connection to manager, 566

↓

In response to detecting closed connection to manager, agent initiates rollback of temporary instrumentation, 568

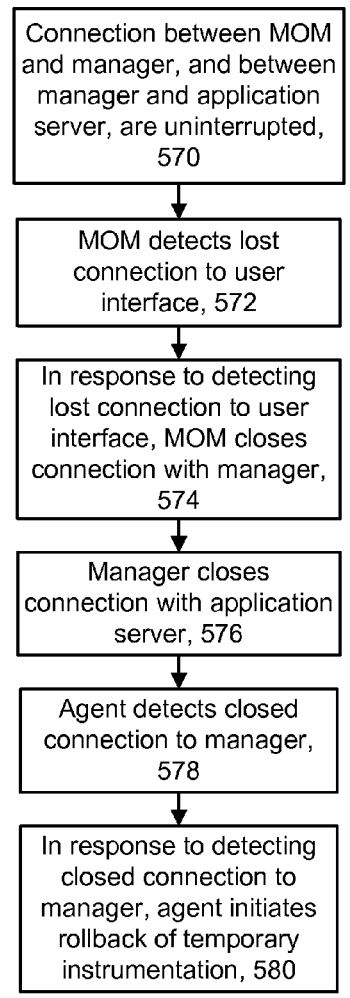

Fig. 5G

Connection between MOM and manager, and between manager and application server, are uninterrupted, 570

↓

MOM detects lost connection to user interface, 572

↓

In response to detecting lost connection to user interface, MOM closes connection with manager, 574

↓

Manager closes connection with application server, 576

↓

Agent detects closed connection to manager, 578

↓

In response to detecting closed connection to manager, agent initiates rollback of temporary instrumentation, 580

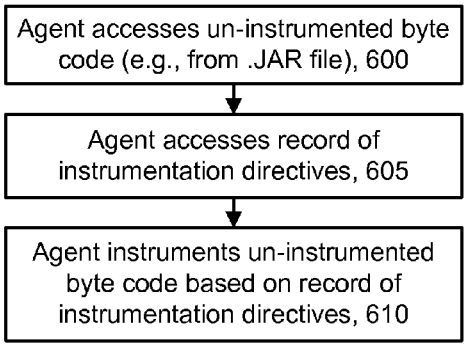

Fig. 6

Agent accesses un-instrumented byte code (e.g., from .JAR file), 600

↓

Agent accesses record of instrumentation directives, 605

↓

Agent instruments un-instrumented byte code based on record of instrumentation directives, 610

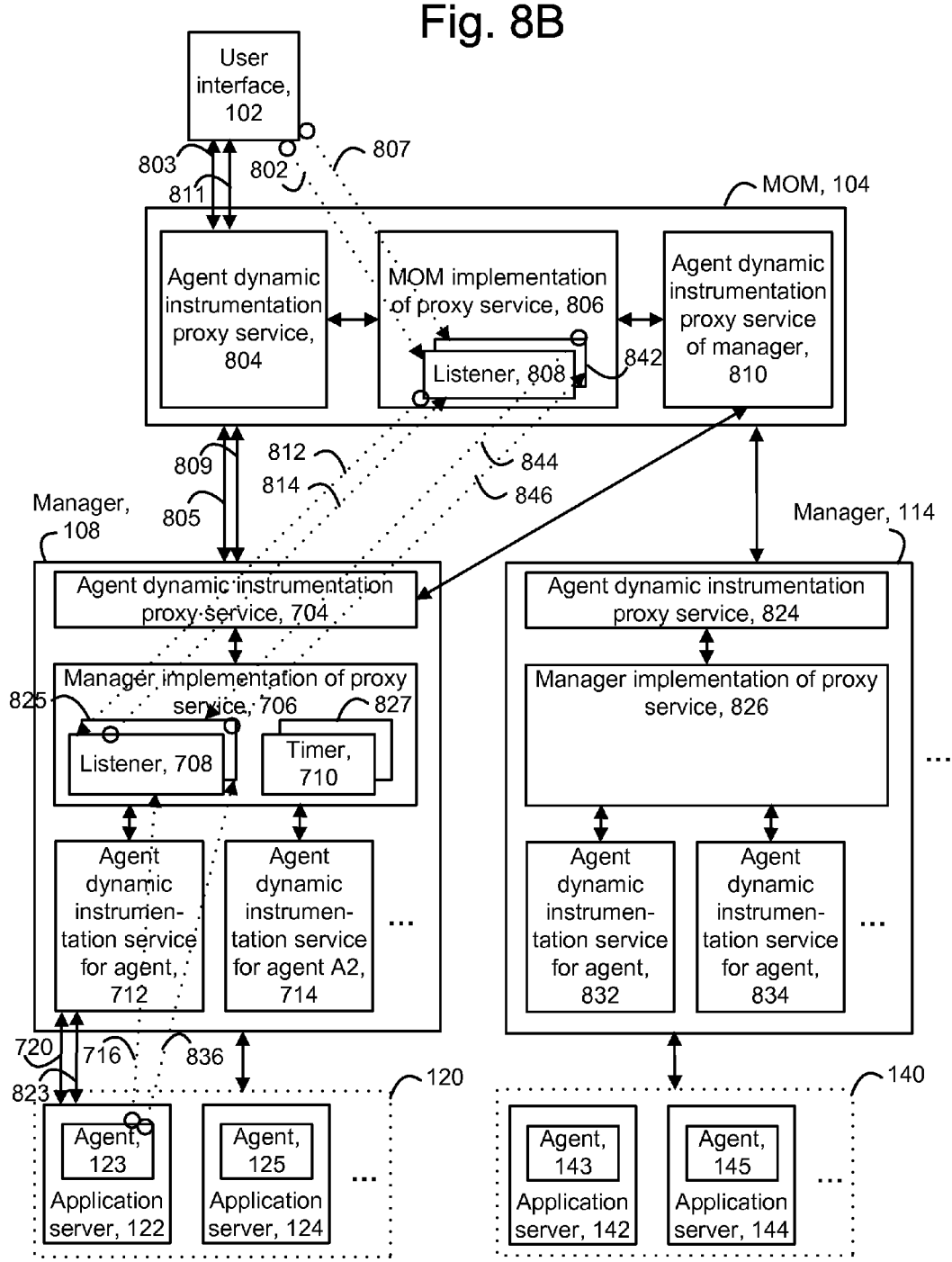

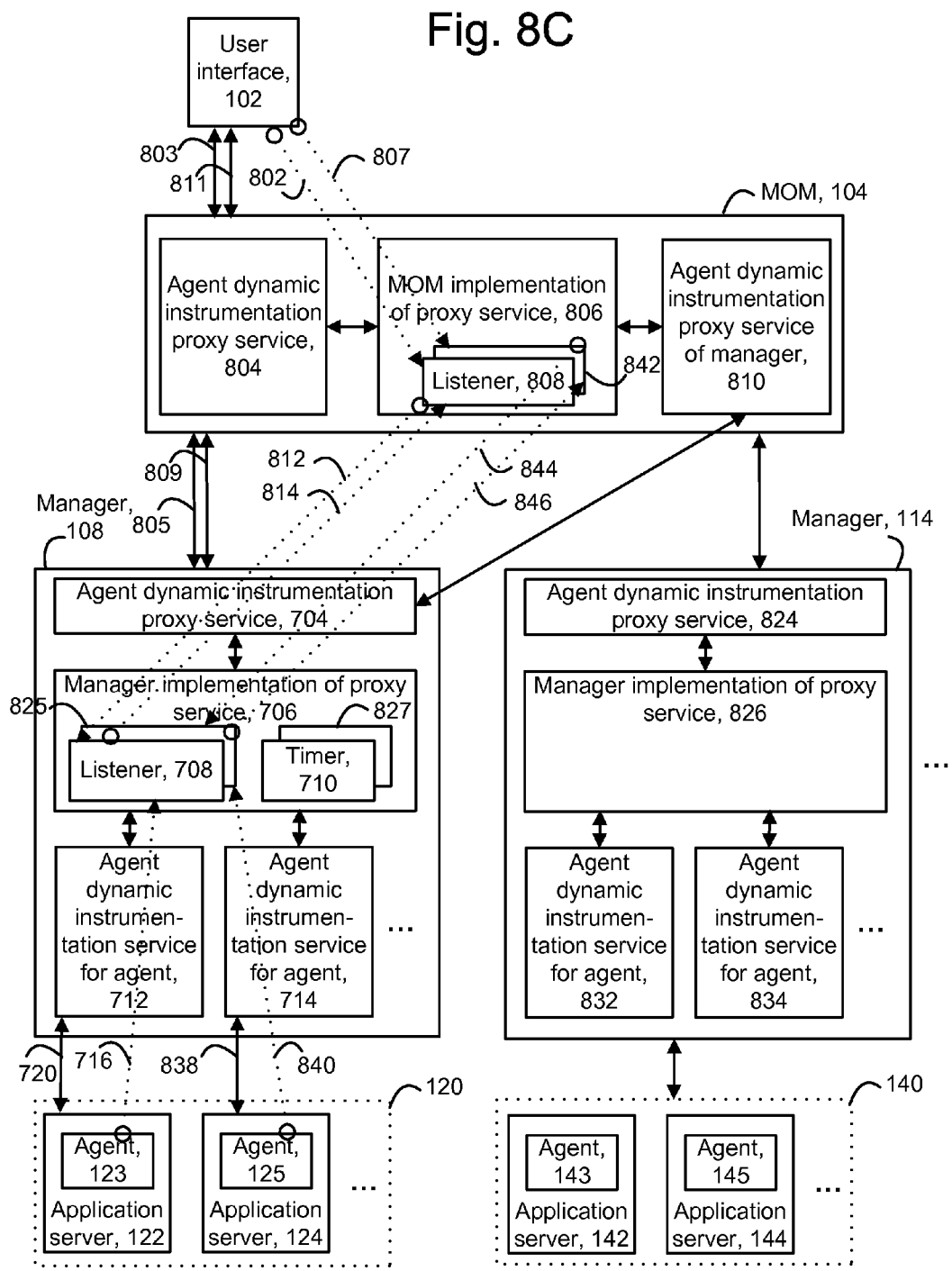

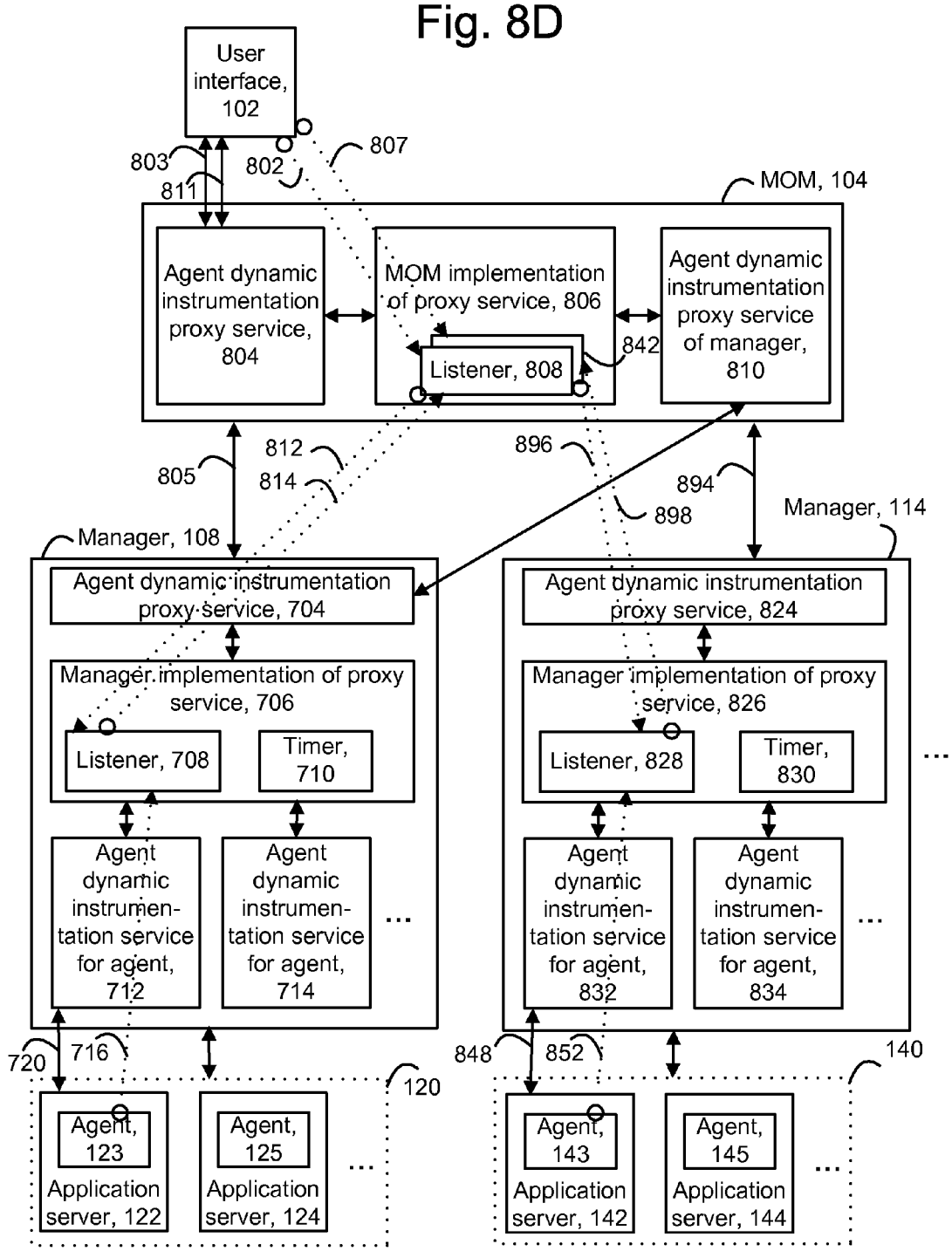

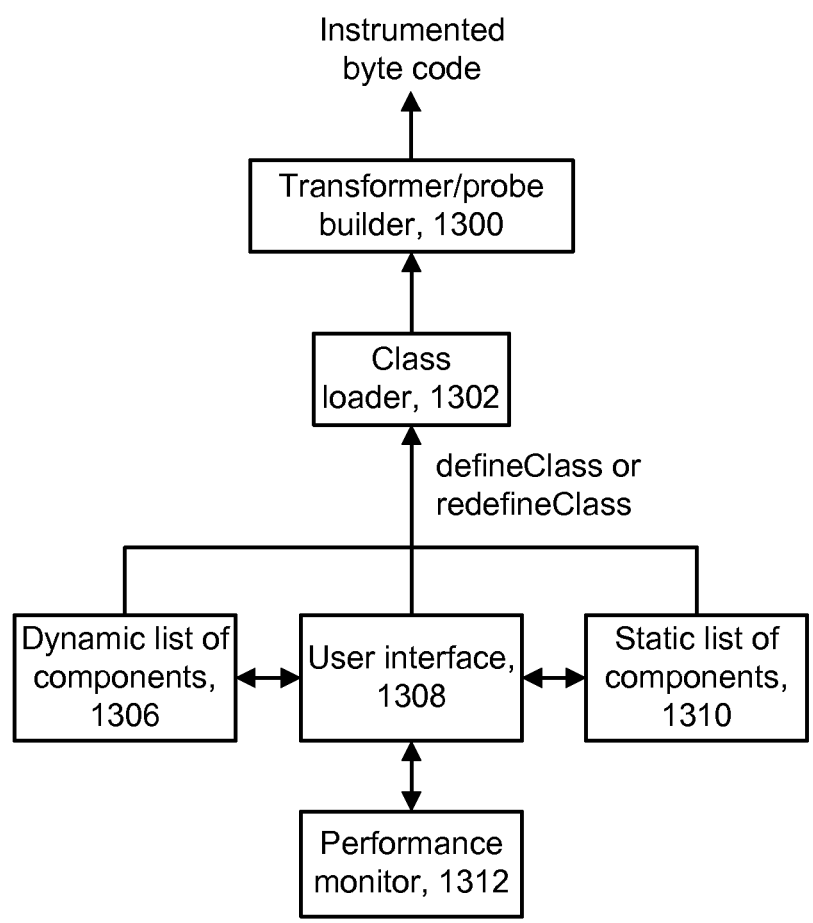

FAILSAFE MECHANISM FOR DYNAMIC INSTRUMENTATION OF SOFTWARE USING CALLBACKS

BACKGROUND OF THE INVENTION

1. Field of the Invention

The present invention is directed to technology for monitoring software in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. One type of trace is a stack trace. Traces can be used as an aid in debugging.

Moreover, in some cases, additional instrumentation can be added to an application, such as to diagnose a particular performance problem. However, a failsafe mechanism is needed for installing and removing the additional instrumentation.

SUMMARY OF THE INVENTION

The present invention provides a failsafe mechanism for installing and removing temporary instrumentation during a runtime of an application.

In one embodiment, a computer-implemented method for providing a failsafe capability for an application is provided. The method includes receiving a request at an application server to add temporary dynamic instrumentation to the application, where the request is received from a computing device via a respective connection between the computing device and the application server. The method further includes, in response to the request, adding the temporary dynamic instrumentation to the application during the runtime of the application, and implementing a callback to the computing device via the respective connection, where the callback determines if the respective connection is unexpectedly lost. The method further includes, in response to the callback determining that the respective connection is unexpectedly lost, restoring the application to a state which does not include the temporary dynamic instrumentation.

In another embodiment, a computer-implemented method for providing a failsafe capability for applications includes receiving a request at a first computing device, such as a collector, from a second computing device, where the request identifies an application server and includes directives for adding associated temporary dynamic instrumentation to an application at the application server. The method further includes, in response to the request, implementing a timer, and providing, from the first computing device to the application server via a first connection, the directives to add the associated temporary dynamic instrumentation to the application, and a request to implement a callback to the first computing device, where the callback determines if the first connection is unexpectedly lost. The method further includes, upon expiration of the timer, if the first connection is not unexpectedly lost, providing a request to the application server via the first connection to restore the application to a state which existed before the associated temporary dynamic instrumentation was added.

In another embodiment, in an application server, a tangible computer readable storage is provided having computer readable software embodied thereon for programming at least one processor to perform a method for providing a failsafe capability for an application. The method performed includes establishing a connection with a computing device, and receiving a request, from the computing device, via the connection, to add temporary dynamic instrumentation to the application, and to invoke a callback object. The method further includes, in response to the request, adding the temporary dynamic instrumentation to the application during the runtime of the application, and invoking the callback object, where the callback object implements a callback to the computing device by monitoring the connection. The method further includes, if the callback object determines that the connection has been terminated, restoring the application to a state which does not include the temporary dynamic instrumentation.

Corresponding methods, systems and computer- or processor-readable storage devices which include a storage media encoded with instructions which, when executed, perform the methods provided herein, may be provided.

BRIEF DESCRIPTION OF THE DRAWINGS

FIG. 5E depicts an example scenario of step 325 of FIG. 3 involving a MOM, a user interface, a manager and an application server, where a failure is detected in a connection between the manager and the application server.

FIG. 5F depicts an example scenario of step 325 of FIG. 3 involving a MOM, a user interface, a manager and an application server, where a failure is detected in a connection between the manager and the MOM.

FIG. 5G depicts an example scenario of step 325 of FIG. 3 involving a MOM, a user interface, a manager and an application server, where a failure is detected in a connection between the user interface and the MOM.

FIG. 6 depicts an example implementation of step 330 of FIG. 3.

FIG. 8B depicts an example implementation of the use of callbacks in the process of FIG. 3 involving a MOM, a manager and one agent, for two items of temporary instrumentation.

FIG. 8C depicts an example implementation of the use of callbacks in the process of FIG. 3 involving a MOM, a manager and a two agents, for two items of temporary instrumentation involving one agent.

FIG. 8D depicts an example implementation of the use of callbacks in the process of FIG. 3 involving a MOM, two managers and two agents, for two items of temporary instrumentation involving two agents.

FIG. 13 depicts an example process flow for instrumenting software.

DETAILED DESCRIPTION

The present invention provides a failsafe mechanism for installing and removing temporary instrumentation during a runtime of an application.

Initially, software such as an application can be configured with a baseline set of instrumented components such as methods. Typically, instrumentation is applied to an application selectively and judiciously to minimize overhead costs. Developers rely on previous experience to develop an optimal instrumentation package. Over time, experience is gained and various problems or areas for improvement with the application may be identified. Additional instrumentation can be deployed in the application in various situations, such as to diagnose a performance problem. However, a failsafe mechanism is needed which will ensure that additional instrumentation which is meant to be applied temporarily is automatically, without human intervention, removed, even when there is an interruption in a communication link to the application, a computing device failure, a software failure, or some other type of failure, which renders it impossible to manually roll back the instrumentation from a remote user interface, e.g., remote from a computing device such as an application server on which the application runs. Without such a failsafe mechanism, temporary instrumentation could unexpectedly and severely impair the application's performance. For example, the temporary instrumentation could inadvertently include a command such as to instrument all classes, which results in an excessive computational burden.

In an example implementation, a failsafe mechanism is provided using callbacks between an agent of the application on one computing device, one or more manager computing devices and/or a user interface/workstation. The callbacks monitor connections which are established between computing devices. If a connection is lost unexpectedly, e.g., due to a communication link failure or other problem, the callback is terminated. Similarly, a planned closing of a connection also leads to a callback being terminated. Further, the termination of one callback can cascade to one or more other callbacks so that the agent is ultimately informed of a problem. When the callback to the agent is terminated, a rollback procedure is implemented which returns the application to a state which existed before the additional instrumentation was added.

Figure 1:
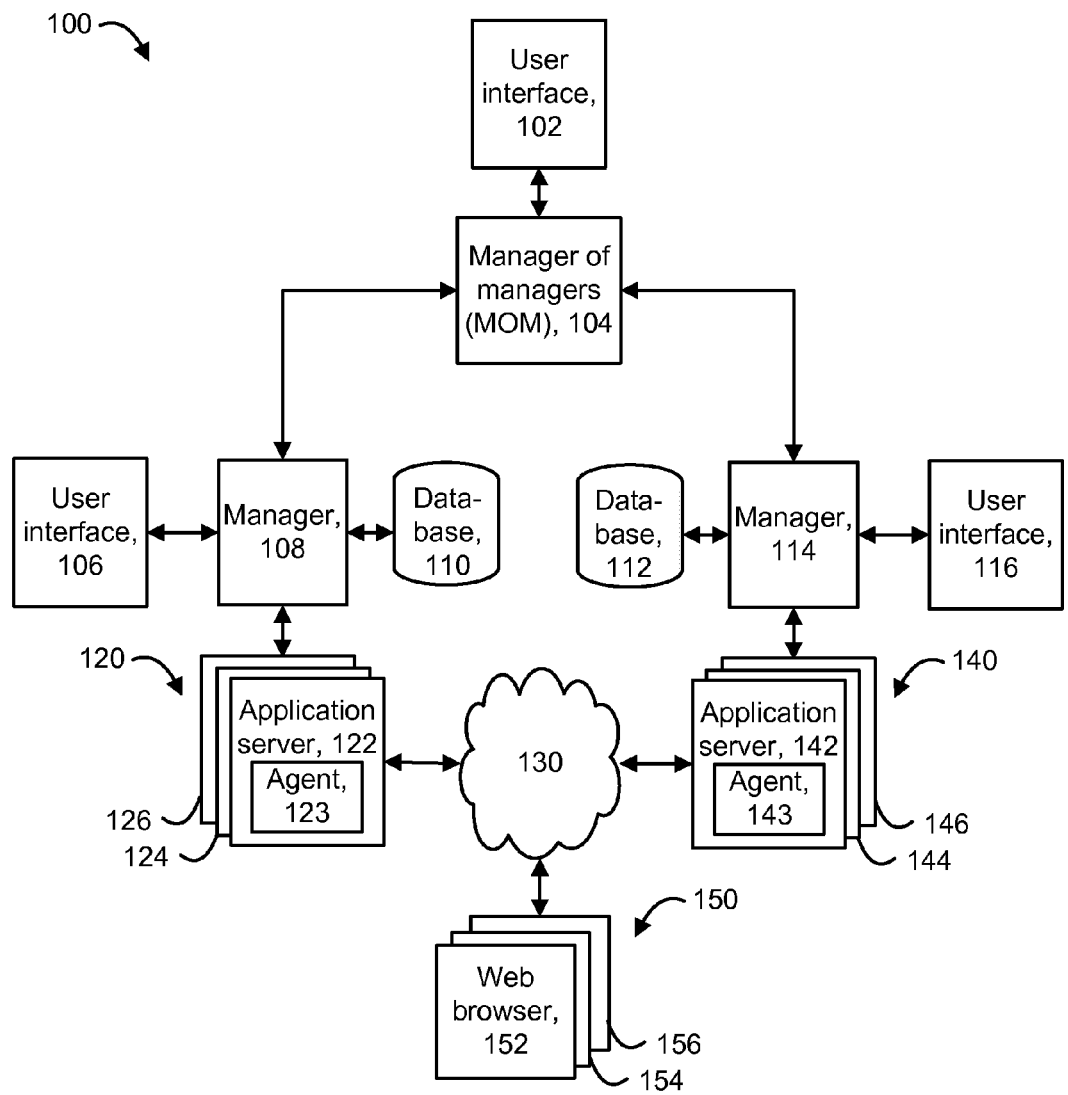
FIG. 1 depicts a system which includes a managed application.

FIG. 1 depicts a network in which different computer systems provide data to a manager. Like-numbered elements correspond to one another in the figures. Computer systems can be arranged in a number of different ways. In one approach, a set of application servers run applications and agent software which reports back to a common manager computing device. In another approach, there are multiple sets of application servers which each report back to a respective manager computing device, and the respective manager computing devices report back to a higher level manager computing device referred to as a manager of managers (MOM). Additional levels in a hierarchy of managers can be provided as well. Each manager or MOM computing device may communicate with an associated user interface/workstation such as to provide information and receive instructions.

An example system 100 includes a set 120 of application servers and respective agents, including application servers 122, 124 and 126. Agent 123 of application server 122 is depicted. Each application server can have one or more agents. In one approach, a separate agent is provided for each instance of an application. The application servers are an example of any type of computer system having a processor for executing code to achieve a desired functionality. The application servers can run different applications, or separate instances of the same application. The application servers can be located remotely from one another or co-located. The set of application servers 120 communicate with a local manager computer 108, in this example. The manager computer 108 could alternatively be remote from the set of application servers 120, in which case communication between them may occur via a network cloud 130.

The example implementation further includes a set of application servers 140 and respective agents, including application servers 142, 144 and 146. Agent 143 of application server 142 is depicted. The set of application servers 140 communicate with a local manager computer 114, in this example.

For example, a corporation running an enterprise application such as a web-based e-commerce application may employ a number of application servers at one location for load balancing, while also employing application servers at different locations as a failsafe measure. Requests from users, such as from a set of web browsers 150, including individual web browsers 152, 154 and 156, are received via the network cloud 130 such as the Internet, and can be routed to any of the application servers in the sets 120 or 140.

The set of web browsers 150 typically accesses the network cloud 130 via an Internet Service Provider, not shown. Agent software running on the application servers gather information from an application, middleware or other software, running on the respective application servers, in one possible approach. For example, such information may be obtained using instrumentation, one example of which is byte code instrumentation. However, the gathered data may be obtained in other ways as well. The agents essentially live in the computer system being monitored and provide a data acquisition point. The agents organize and optimize the data communicated to the managers 108 and 114.

Various approaches are known for instrumenting software to monitor its execution. For example, as mentioned at the outset, tracing may be used to track the execution of software. One example of tracing is discussed in U.S. Patent Application Publication No. 2004/0078691, titled "Transaction Tracer", published Apr. 22, 2004, incorporated herein by reference. In one approach discussed therein, object code or byte code of an application to be monitored is instrumented, e.g., modified, with probes. The probes measure specific pieces of information about the application without changing the application's business or other logic. Once the probes have been installed in the byte code of an application, it is referred to as a managed application. The agent software receives information such as performance data from the probes and may communicate the information to another process, such as at the manager 108 or 114, or process the information locally, such as to determine whether the information indicates an abnormal condition. For example, the information from the probes may indicate performance data such as start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents are typically aware of the software executing on the local application servers with which they are associated.

The managers 108 and 114 can be provided on separate computing devices which communicates with a user interface 106 or 116, respectively, to display information based on data received from the agents. The user interfaces could also represent separate computing devices. See example user interface displays in FIGS. 10 and 11. The managers 108 and 114 can also access databases 110 and 112, respectively, to store the data received from the agents. In the example provided, the application servers can communicate with the respective managers without accessing the network cloud 130. For example, the communication may occur via a local area network. In other designs, the managers can receive data from the agents of a number of application servers via the network cloud 130. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. See also FIG. 9. The managers and user interface displays might be provided at a corporate headquarters location. Other applications which are not necessarily web-based or involve retail or other sales, can similarly employ agents and managers for managing their systems. For example, a bank may use an application for processing checks and credit accounts. Moreover, in addition to the multi-computer system arrangements mentioned, a single computer system can be monitored as well with one or more agents.

The MOM 104 communicates with the managers 108 and 114, such as to provide commands and receive data. The MOM 104 may also communicate with a user interface 102, such as on a separate computing device, to provide data and receive user commands. The MOM can act as a central manager for the lower level managers, coordinating communications between the user interface 102 and the managers.

Figure 2:
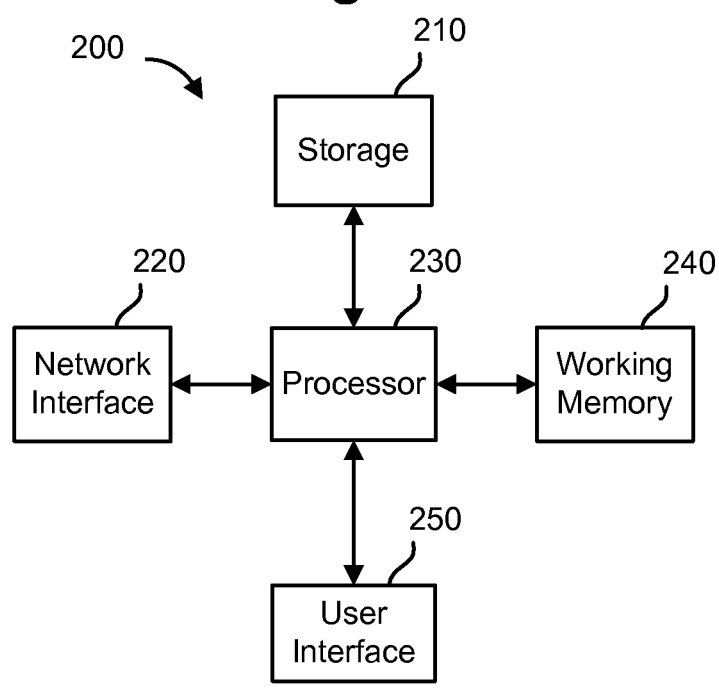
FIG. 2 depicts a computer system of the network of FIG. 1.

FIG. 2 depicts a computer system of the network of FIG. 1. The computer system 200 is a simplified representation of a system which might be used as one of the web browsers, application server, managers, MOM and/or user interfaces, such as discussed in connection with FIG. 1. The computer system 200 includes a storage device 210 such as a hard disk or portable media, a network interface 220 for communicating with other computer systems, a processor 230 for executing software instructions, a working memory 240 such as RAM for storing the software instructions after they are loaded from the storage device 210, for instance, and a user interface display 250. The storage device 210 may be considered to be a processor readable storage device having processor readable code embodied thereon for programming the processor 230 to perform methods for providing the functionality discussed herein. The user interface display 250 can provide information to a human operator based on the data received from one or more agents. The user interface display 250 can use any known display scheme, whether graphical, tabular or the like. In addition to an on-screen display, an output such as a hard copy such from a printer can be provided.

Further, the functionality described herein may be implemented using hardware, software or a combination of both hardware and software. For software, one or more tangible processor readable storage devices having processor readable code embodied thereon for programming one or more processors may be used. The tangible processor readable storage devices can include computer readable media such as volatile and nonvolatile media, removable and non-removable media. For example, tangible computer readable media may include volatile and nonvolatile, removable and non-removable media implemented in any method or technology for storage of information such as computer readable instructions, data structures, program modules or other data. Examples of tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

Figure 3:
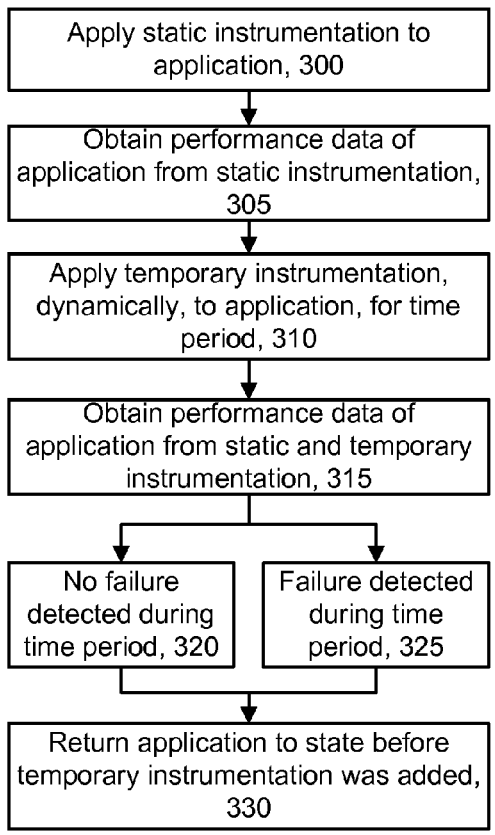
FIG. 3 depicts an overview of an example failsafe method for applying temporary instrumentation to an application.

FIG. 3 depicts an overview of an example failsafe method for applying temporary instrumentation to an application. Step 300 includes applying static instrumentation to an application. See, e.g., FIGS. 12A, 12B and 13 for further details. Step 305 includes obtaining performance data of the application from static instrumentation. As the application executes, the instrumentation reports to a respective manager so that the performance of the application can be monitored. See, e.g., FIG. 14, region 1406 for further details. Step 310 includes applying temporary instrumentation, dynamically, to the application. As mentioned, additional instrumentation may be applied temporarily to an application such as to diagnose performance problems. Such instrumentation can be applied dynamically, e.g., during a runtime of the application, so that there is no downtime of the application. See, e.g., FIGS. 4A and 4B for further details. The temporary instrumentation may be applied for a defined time period, such as a number of minutes or hours, which is enforced by a timer process. The end of the time period is an expiration time at which the temporary instrumentation will be automatically removed, if it is still present in the application and has not been manually removed or otherwise removed already. This ensures that the temporary instrumentation will not extend before a specified time/date, as a failsafe mechanism.

Further, note that in some cases, different items or units of temporary instrumentation can be added to an application, concurrently or at different times, and can have different expiration times. For example, one set of classes of an application can have temporary instrumentation added at one point in time, and have a first expiration time, while another set of classes of the application can have temporary instrumentation added at another point in time, and have a different, second expiration time.

Step 315 includes obtaining performance data of the application from the static and temporary instrumentation. Once the temporary instrumentation is applied, performance data from the temporary instrumentation becomes available in addition to the previously-available performance data from the static instrumentation.

At this point, one of two scenarios can occur. At step 320, no failure is detected during the time period. This can indicate, e.g., that there was no interruption in a communication link to the application, a computing device failure, a software failure, or some other type of failure, which renders it impossible to manually roll back the instrumentation of the application from a remote user interface. A failure can be detected by one or more computing devices, including the application server, a manager computer, a MOM computer and a user interface/workstation computer. See, e.g., FIGS. 5A and 5B for further details.

The second scenario is at step 325, in which a failure is detected. See, e.g., FIGS. 5C to 5G for further details.

In either case, step 330 includes returning the application to a state which existed before the temporary instrumentation was added. This step can include rolling back, or removing, the temporary instrumentation. The state represents the state of the instrumentation applied to the application, and not necessarily any other configuration or data maintained by the application. This can be a state which does not include the temporary instrumentation. Step 330 is performed sooner when a failure is detected than when no failure is detected.

Note that when different items of temporary instrumentation are added, a failure can involve fewer than all of the items so that the rollback also involves fewer than all of the items. For example, if temporary instrumentation items A and B (e.g., where A represents a first set of one or more classes, and B represents a second set of one or more classes) are added, and a failure involves only item B, then the instrumentation can be rolled back so that item A is still included in the application but item B is not. Also, it is possible for instrumentation to be added dynamically and permanently, so that it is not associated with an expiration time, in addition to adding instrumentation temporarily. In this case, the rollback can leave the permanent instrumentation in place.

Figure 4A:
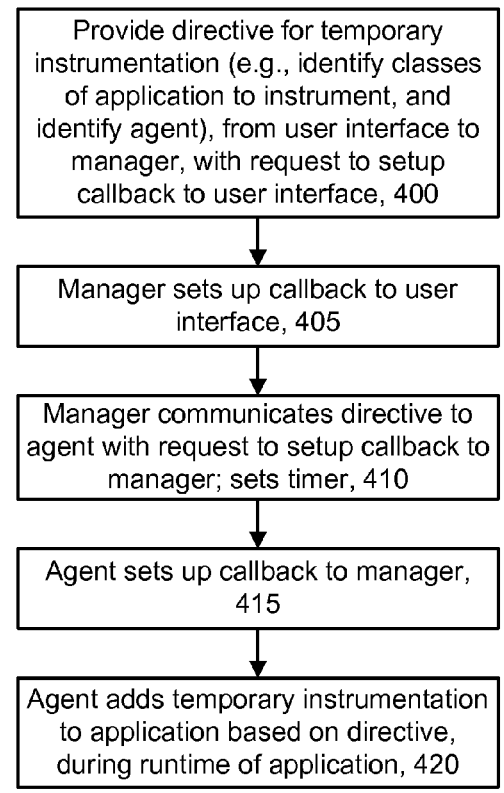
FIG. 4A depicts an example implementation of step 310 of FIG. 3 involving a manager and an agent.

FIG. 4A depicts an example implementation of step 310 of FIG. 3 involving a manager and an agent. See also the example scenario of FIG. 7. To apply temporary instrumentation, that is, instrumentation which is meant to be active for only a limited period of time, step 400 includes providing one or more directives for temporary instrumentation from a user interface to a manager, with a request to setup a callback to the user interface. For example, the one or more directives can be provided from the user interface 106 to the manager 108 for instrumenting one or more applications of the application servers 120, or the directives can be provided from the user interface 116 to the manager 114 for instrumenting one or more applications of the application servers 140 (FIG. 1). The directives can be provided by a user command via the user interface, for example. The directives are rules and can identify classes of the application to instrument, for instance, as well as identifying an agent which is to perform the instrumenting. The directives can be in a request to apply instrumentation which includes a parameter that identifies the agent's name. The agent's name can be a key to cached information associated with an IP address of the agent and the application server that the agent monitors.

Generally, for two computing devices to communicate, a persistent connection can be established between them. The connection may use a connection-oriented transmission protocol such as TCP. In particular, a connection between computing devices can be provided between sockets of the computing devices. A socket can be an endpoint of a bidirectional inter-process communication flow across a computer network. Further, a socket can deliver incoming data packets to an appropriate application process or thread, based on a combination of local and remote IP addresses and port numbers. A socket may have a socket address including (a) an IP address, which identifies the computing device, and (b) a port, which is mapped to an application program process or thread (such as a callback). Specifically, a socket may be characterized by a combination of: (a) a protocol, such as a transport protocol (e.g., TCP, UDP), raw IP, or others, (b) a local socket address, including the local IP address and port number, and (c) a remote socket address in the case of established TCP sockets, when a TCP server serves multiple clients concurrently. When computing devices communicate via a connection, the connection can use TCP/IP, HTTP, HTTP or TCP tunneling, or any other approach.

Moreover, when directives for different items of temporary instrumentation are provided at different times, or otherwise in separate requests, a separate connection and socket can be provided and monitored separately by a computing device for each item.

In response to step 400, at step 405, the manager sets up a callback to the user interface. A callback can be executable code which runs at the manager to monitor a connection between a computing device of the manager and a computing device of the user interface. For example, the callback code at a computing device can continuously monitor the socket which is used to provide a connection with another computing device to determine if the connection is active or has been closed or lost. A callback can include code such as a callback handler on one side of the connection and a callback listener on the other side of the connection.

At step 410, the manager communicates the one or more directives to the identified agent and application server with a request to setup a callback to the manager. The manager also sets a timer based on a time period or expiration date specified in the request from the user interface. The communication between the manager and agent can involve establishing a connection via sockets as described above.

In response, at step 415, the agent sets up a callback to the manager, similar to the manner in which the manager set up a callback to the user interface in step 405. At step 420, based on the one or more directives, the agent adds temporary instrumentation to the application during a runtime of the application, e.g., as described further in connection with FIG. 13.

Figure 4B:
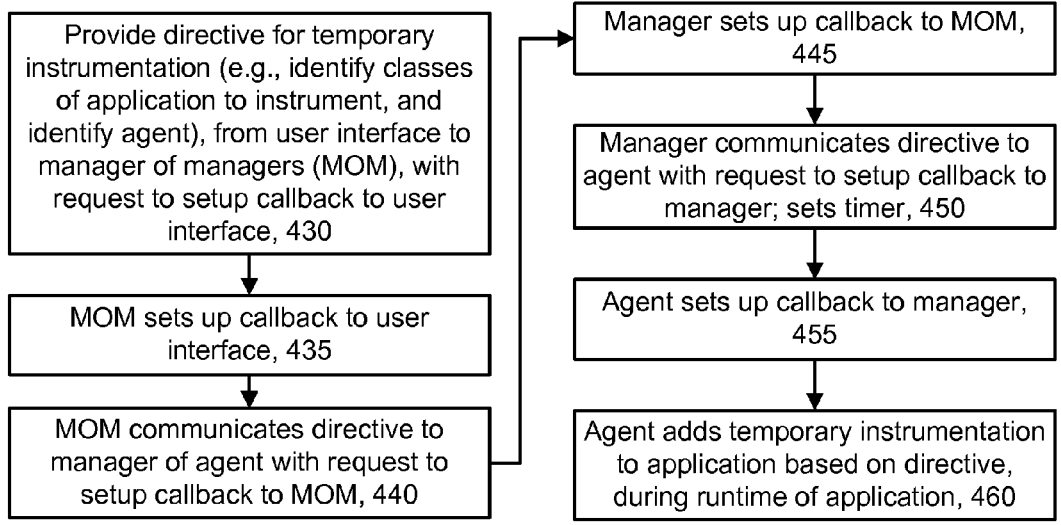
FIG. 4B depicts an example implementation of step 310 of FIG. 3 involving a manager of managers (MOM), a manager, and an agent.

FIG. 4B depicts an example implementation of step 310 of FIG. 3 involving a manager of managers (MOM), a manager, and an agent. The example of FIG. 4A involves three computing devices: a user interface, a manager and an application server. Compared to FIG. 4A, this example additionally involves a MOM computing device between the user interface and the manager. See the example scenarios of FIGS. 8A-D. Step 430 provides one or more directives for temporary instrumentation (e.g., by identifying classes of an application to instrument, and by identifying agent), from a user interface to the MOM, with a request to setup a callback to the user interface. At step 435, the MOM sets up a callback to the user interface. At step 440, the MOM communicates the one or more directives to a manager of the identified agent with a request to setup a callback to the MOM. At step 445, the manager sets up a callback to the MOM. At step 450, the manager communicates the one or more directives to the agent with a request to setup a callback to the manager. The manager also sets a timer. At step 455, the agent sets up a callback to the manager. At step 460, the agent adds temporary instrumentation to the application based on the one or more directives, during a runtime of the application.

For example, the directives can be provided from the user interface 106 to the MOM 104, and from the MOM 104 to the manager 108 for instrumenting one or more applications of the application servers 120, and/or to the manager 114 for instrumenting one or more applications of the application servers 140 (FIG. 1).

Figure 5A:
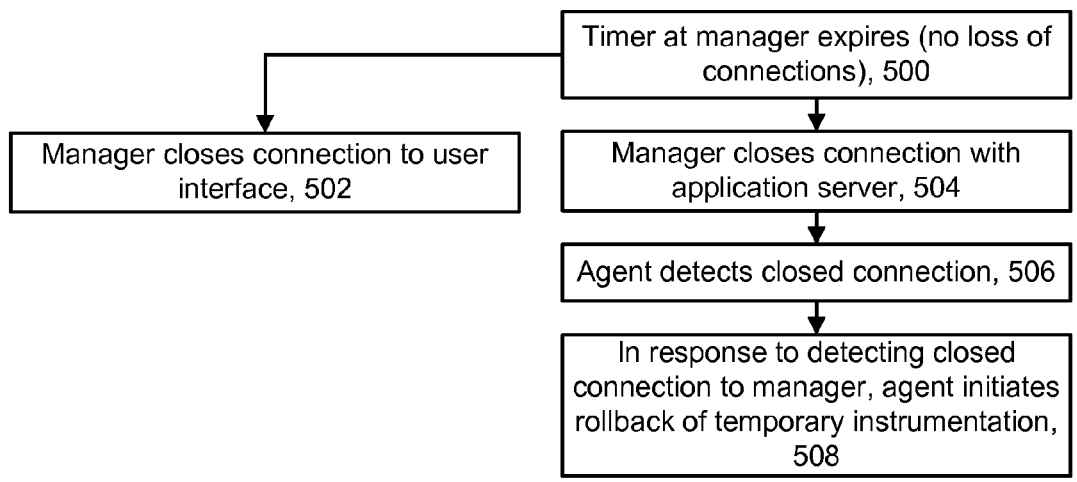
FIG. 5A depicts an example scenario of step 320 of FIG. 3 involving a manager and an application server, where no failure is detected.

FIG. 5A depicts an example scenario of step 320 of FIG. 3 involving a manager and an application server, where no failure is detected. At step 500, the timer at the manager expires, where no loss of a connection is detected by the manager. Recall that the time defines the time period for the temporary instrumentation to be active. In the case where the manager has a callback to the user interface via a first connection and the application server has a callback to the manager via a second connection, this situation occurs when both connections remain active throughout the time period in which the temporary instrumentation is intended to be active.

Further, no other failure such as failure of the manager or the user interface occurs. Note that a failure of the user interface computing device would result in closing the first connection, and the manager thereby detecting the first connection being lost. Similarly, a failure of the application server would result in closing the second connection, and the manager thereby detecting a failure of the second connection.

Upon expiration of the time, the manager closes the connection to the user interface at step 502, and to the application server at step 504. A connection may be closed by the manager in different ways. In one approach, in step 502, when a TCP connection is used, a process at the manager can signal to its TCP layer to indicate that a session with the user interface is no longer needed. The manager sends a message to the user interface indicating that the manager wants to terminate the connection, and the user interface acknowledges the message. In response to the message, when the user interface is ready, a process at the user interface can signal to its TCP layer to indicate that the session is no longer needed, and a corresponding message is sent to the manager, which the manager acknowledges. The user interface closes the connection upon receiving this acknowledgement, and the manager closes the connection a specified time after providing the acknowledgement. The closing of the connection can include closing a socket.

Similarly, in step 504, process at the manager can signal to its TCP layer to indicate that a session with the application server is no longer needed. The manager sends a message to tell the application server that the manager wants to terminate the connection, and the application server acknowledges the message. In response, when the application server is ready, a process at the application server can signal to its TCP layer to indicate that the session is no longer needed, and a corresponding message is sent to the manager, which the manager acknowledges. The application server closes the connection upon receiving this acknowledgement, and the manager closes the connection a specified time after providing the acknowledgement.

At step 506, the agent detects the closed connection. For example, callback code at the agent may detect when the connection is closed by detecting when the socket at the application server is closed.

At step 508, in response to detecting the closed connection to the manager, the agent initiates a rollback of the temporary instrumentation, as discussed in connection with step 330 of FIGS. 3, 6 and 13.

Note that a closing of a connection represents an orderly shutdown of the connection as opposed to an unexpected losing of the connection due to a failure condition.

Figure 5B:
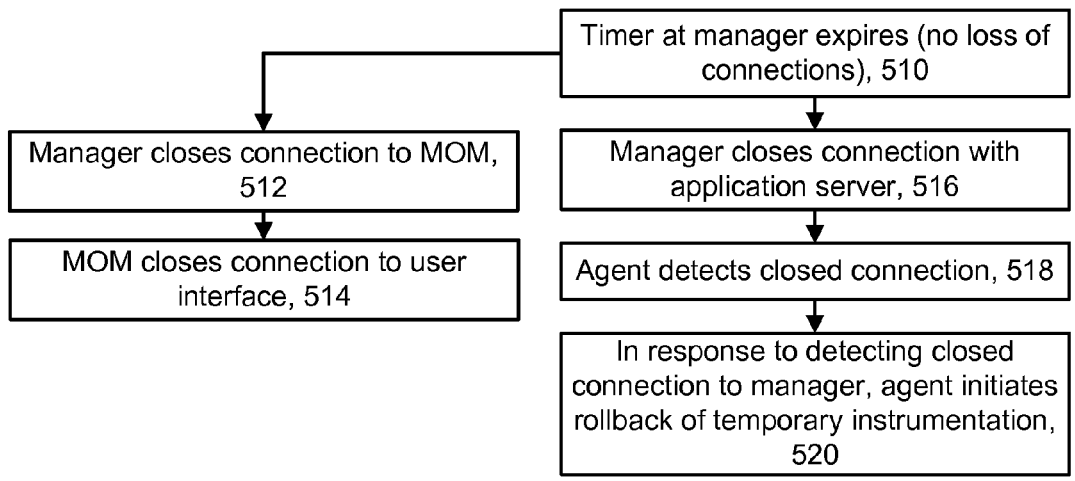
FIG. 5B depicts an example scenario of step 320 of FIG. 3 involving a MOM, a manager and an application server, where no failure is detected.

FIG. 5B depicts an example scenario of step 320 of FIG. 3 involving a MOM, a manager and an application server, where no failure is detected. At step 510, a timer at the manager expires, indicating that no loss of connections by the manager or other failure has been detected. At step 512, the manager closes a connection to the MOM. The closing of a connection may proceed as discussed above, for instance. In response, at step 514, the MOM closes a connection to the user interface. See also FIGS. 8A-8D. Similarly, at step 516, the manager closes a connection with the application server. At step 518, the agent detects the closed connection. For example, callback code at the agent may detect when the connection is closed by detecting when the socket at the application server is closed. At step 520, in response to detecting the closed connection to the manager, the agent initiates a rollback of the temporary instrumentation.

Figure 5C:
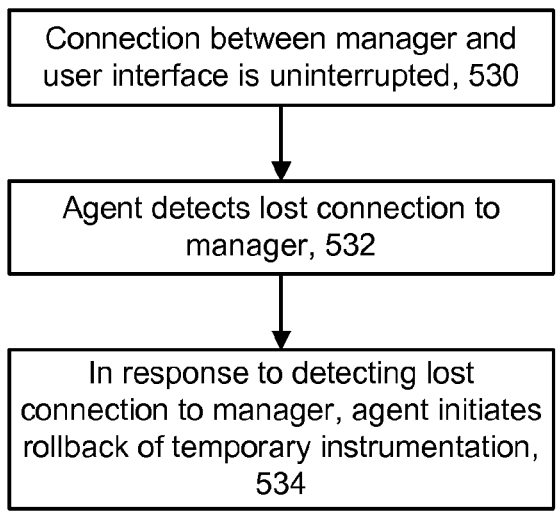
FIG. 5C depicts an example scenario of step 325 of FIG. 3 involving a user interface, a manager and an application server, where a failure is detected in a connection between the manager and the application server.

FIG. 5C depicts an example scenario of step 325 of FIG. 3 involving a user interface, a manager and an application server, where a failure is detected in a connection between the manager and the application server. At step 530, a connection between a manager and a user interface is uninterrupted. However, at step 532, an agent detects a lost connection to a manager. This occurs before the timer at the manager expires, so that the lost connection is unexpected and is due to some type of failure. For example, callback code at the agent may detect when the connection is lost by detecting when the socket at the application server is closed. When a connection is unexpectedly lost, an exception event or other error may be detected by one or both computing devices involved in the connection. For example, the agent can use a callback to determine that a respective connection is lost by determining that the socket generates an event indicating that the respective connection is lost.

At step 534, in response to detecting the lost connection to the manager, the agent initiates a rollback of the temporary instrumentation, as discussed in connection with step 330 of FIG. 3.

Figure 5D:
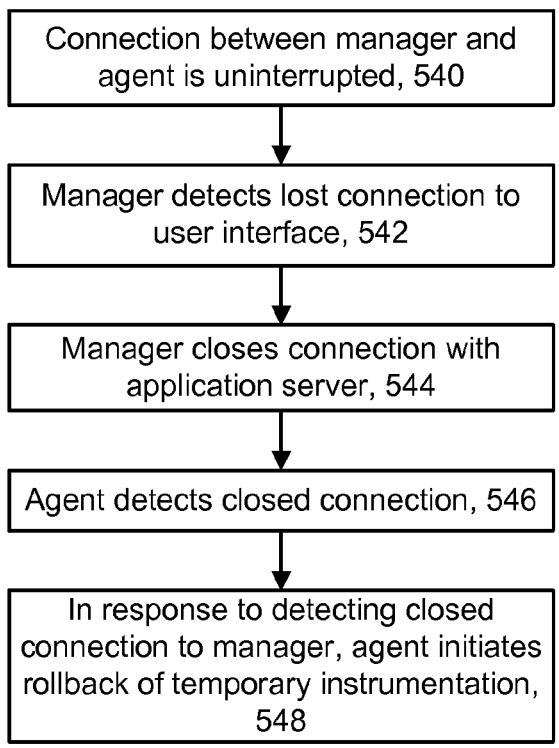
FIG. 5D depicts an example scenario of step 325 of FIG. 3 involving a user interface, a manager and an application server, where a failure is detected in a connection between the manager and the user interface.

FIG. 5D depicts an example scenario of step 325 of FIG. 3 involving a user interface, a manager and an application server, where a failure is detected in a connection between the manager and the user interface. In this scenario, the connection between the manager and the agent is uninterrupted, at step 540. However, step 542 includes the manager detecting a lost connection to the user interface. This is before the timer at the manager for the temporary instrumentation expires. In response to step 542, the manager closes the connection with the application server in step 544. The agent detects the closed connection at 546. At step 548, in response to detecting the closed connection to the manager, the agent initiates a rollback of the temporary instrumentation, as discussed in connection with step 330 of FIG. 3.

In one possible implementation, the rollback is the essentially same regardless of whether a closed or lost connection is detected by the agent.

FIG. 5E depicts an example scenario of step 325 of FIG. 3 involving a MOM, a user interface, a manager and an application server, where a failure is detected in a connection between the manager and the application server. In this scenario, the connections between the MOM and user interface, and between the MOM and a manager, are uninterrupted, at step 550. However, step 552 includes the agent detecting a lost connection to the user interface. This is before the timer at the manager for the temporary instrumentation expires. At step 554, in response to detecting the lost connection to the manager, the agent initiates a rollback of the temporary instrumentation, as discussed in connection with step 330 of FIG. 3.

FIG. 5F depicts an example scenario of step 325 of FIG. 3 involving a MOM, a user interface, a manager and an application server, where a failure is detected in a connection between the manager and the MOM. In this scenario, the connections between the MOM and user interface, and between the manager and application server, are uninterrupted, at step 560. However, step 562 includes the manager detecting a lost connection to the MOM. This is before the timer at the manager for the temporary instrumentation expires. At step 564, in response to detecting the lost connection, the manager closes a connection with the application server. In response, at step 566, the agent at the application server detects the closed connection to the manager. At step 568, in response to detecting the closed connection to the manager, the agent initiates a rollback of the temporary instrumentation, as discussed in connection with step 330 of FIG. 3.

FIG. 5G depicts an example scenario of step 325 of FIG. 3 involving a MOM, a user interface, a manager and an application server, where a failure is detected in a connection between the user interface and the MOM. In this scenario, the connections between the MOM and manager, and between the manager and application server, are uninterrupted, at step 570. However, step 572 includes the MOM detecting a lost connection to the user interface. This is before the timer at the manager for the temporary instrumentation expires. At step 574, in response to detecting the lost connection, the MOM closes a connection with the manager. In response, at step 576, the manager closes a connection with the application server. At step 578, the agent detects the closed connection to the manager. At step 580, in response to detecting the closed connection to the manager, the agent initiates a rollback of the temporary instrumentation, as discussed in connection with step 330 of FIG. 3.

FIG. 6 depicts an example implementation of step 330 of FIG. 3. An example technique for returning an application to a state which existed before temporary instrumentation was added is provided. The technique indicates how the temporary instrumentation can be rolled back, e.g., removed, from an application. A rollback of temporary instrumentation can involve removing directives to apply the temporary instrumentation, so that the agent can restore the previous state of the instrumentation by reloading the byte code of one or more temporarily instrumented classes, and re-applying the directives that were already applied before the temporary instrumentation was added. The rollback can involve redefining one or more classes of the application as discussed in connection with FIG. 13. A history or record of instrumentation which has been applied to an application can be stored at the agent side in an embedded database as a sequence of directives.

At step 600, the agent accesses un-instrumented byte code. For instance, this can involve accessing a .JAR or JAVA Archive file. This is an archive that contains multiple JAVA files. It stores JAVA classes and meta data, and may be run as a program in a JAVA Runtime Environment (JRE™) of a computing device such as an application server. This is essentially the raw byte code before instrumentation is added. At step 605, the agent accesses a record or history of instrumentation directives that were already applied before the temporary instrumentation was added. At step 610, the agent instruments the un-instrumented byte code based on the record of instrumentation directives. These instrumentation directives can include rules for instrumenting the application with instrumentation other than the temporary instrumentation. For example, the instrumentation directives can identify classes of the application which are to be instrumented. Further details are discussed in connection with FIGS. 12A, 12B and 13.

Figure 7:
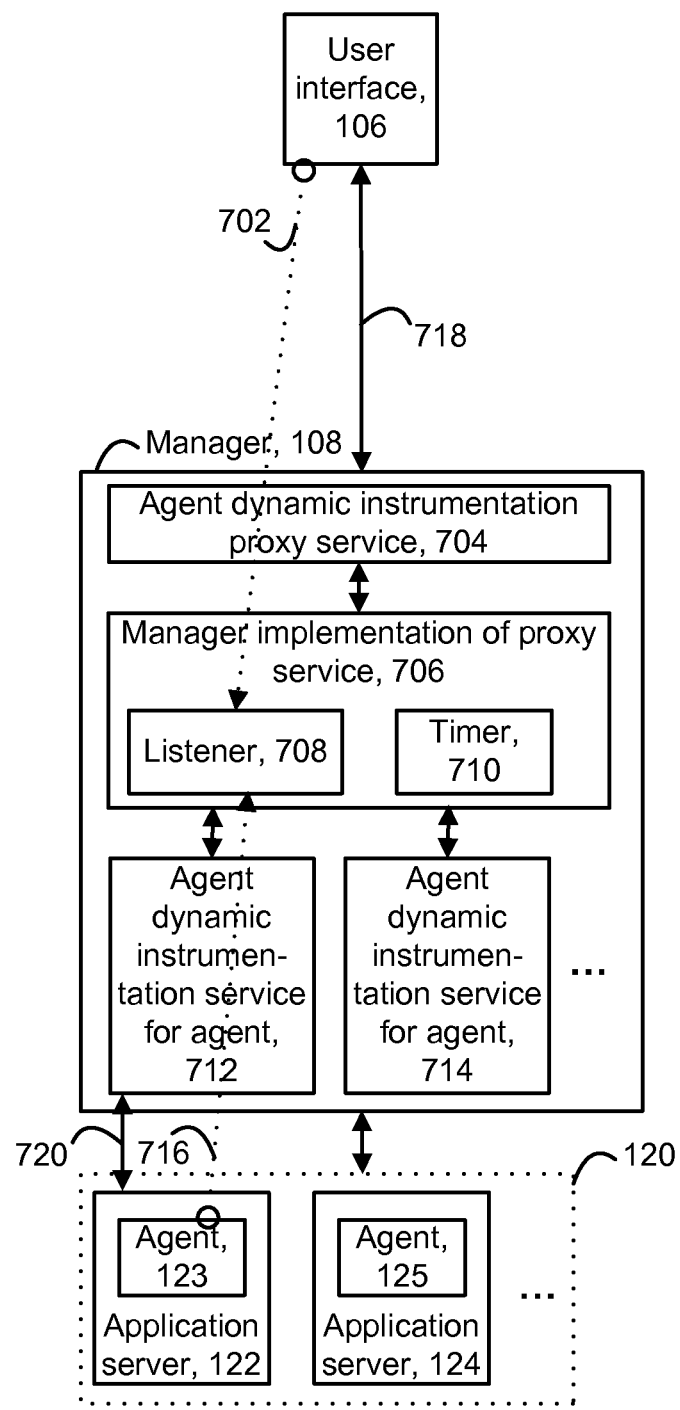
FIG. 7 depicts an example implementation of the process of FIGS. 3 and 4A involving a user interface, a manager and an agent.

FIG. 7 depicts an example implementation of the process of FIGS. 3 and 4A involving a user interface, a manager and an agent. The user interface computing device 106, manager computing device 108, and set of application servers 120 of FIG. 1 are depicted. Also depicted are application servers 122 and 124 and associated agent 123 and 125, respectively. The manager 108 includes software 704 for interfacing with the user interface 106. The software 704 provides an agent dynamic instrumentation proxy service for any of the agents 123, 125, . . . . Software 706 represents a manager implementation of a proxy service, and includes a listener 708 and a timer 710. The software 706 interfaces with the software 704. When multiple items of temporary instrumentation are active, a listener and timer pair can be provided for each item. Software in the form of an agent dynamic instrumentation service is provided for each agent. Specifically, software 712 is provided for interfacing with agent 123, and software 714 is provided for interfacing with agent 125. The software 706 also interfaces with the software 712 and 714.

In this example, a solid bidirectional line 718 represents a connection which is opened between the user interface 106 and the manager 108, and a solid bidirectional line 720 represents a connection which is opened between the application server 122 and the manager 108, e.g., the process 712 of the manager 108.

A dotted line 702 represents a callback between the user interface 106 and the listener 708 of the manager. The circled end of the dotted line represents a callback handler process, which is callback code, while the arrowhead end of the line points to a listener process which is also callback code. Thus, for the callback 702, a callback handler is at the user interface 106. Similarly, a dotted line 716 represents a callback between the agent 123 and the listener 708 of the manager, where a callback handler is at the agent 123. When temporary instrumentation is applied to an application in the application server 122, the timer 710 keeps track of a time period in which the temporary instrumentation is to be kept active. Further, the callback 716 monitors the connection 720 and the callback 702 monitors the connection 718. Essentially, both ends of a callback can monitor the same connection. For instance, the application server 122 or the manager 108 can use the callback 716 to determine if the connection 720 is lost, and the user interface 106 or the manager 108 can use the callback 702 to determine if the connection 718 is lost.

Figure 8A:
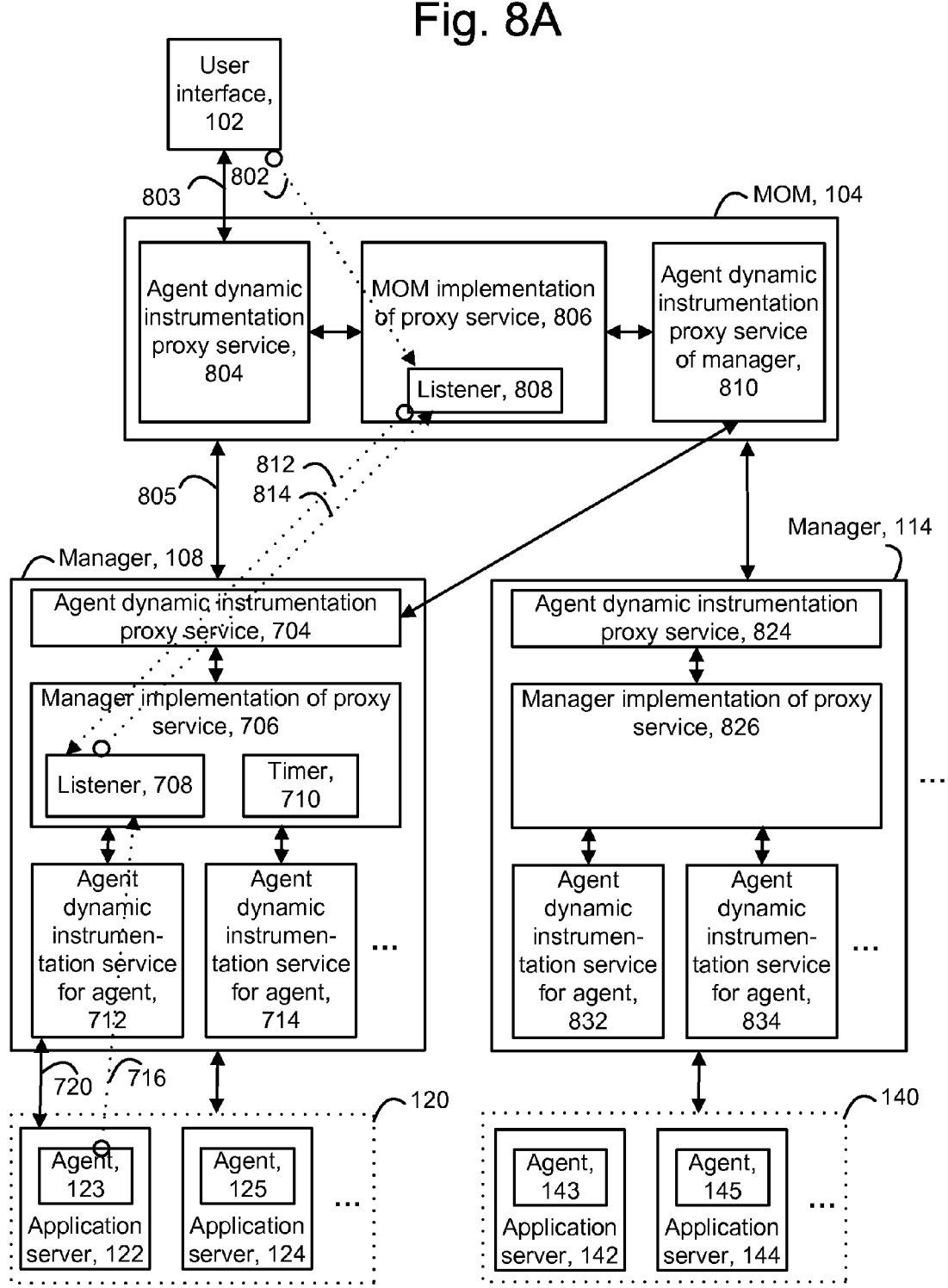
FIG. 8A depicts an example implementation of the use of callbacks in the process of FIG. 3 involving a MOM, a manager and an agent, for one item of temporary instrumentation involving one agent.

FIG. 8A depicts an example implementation of the use of callbacks in the process of FIG. 3 involving a MOM, a manager and an agent, for one item of temporary instrumentation involving one agent. The user interface 102, MOM 104 and manager 114 of FIG. 1 are depicted. The MOM includes software 804 for an agent dynamic instrumentation proxy service which interfaces with the user interface 102, a MOM implementation of a proxy service 806, including a listener 808, and an agent dynamic instrumentation proxy service of a manager 810, which interfaces with one or more managers such as managers 108 and 114. A solid bidirectional arrow 803 represents a connection between the MOM 104 and the user interface 102.

The manager 114 includes components which are similar to the manager 108, including software 824 for an agent dynamic instrumentation proxy service, and software 826 for a manager implementation of a proxy service. No listener or tinier is provided in this example since a callback involving the manager 114 is not depicted. Agent dynamic instrumentation service software 832 and 834 is provided for agents 143 and 145 of application servers 142 and 144, respectively, of FIG. 1.

A dotted line 802 represents a callback between the user interface 102 and the listener 808 of the MOM 104, where a callback handler is at the user interface 102. Similarly, dotted line 812 represents a callback between the manager 108 and the listener 808 of the MOM, where a callback handler is at the listener 808. Dotted line 814 represents a callback between the manager 108 and the listener 808 of the MOM, where a callback handler is at the listener 708. A solid bidirectional arrow 805 represents a connection between the MOM 104 and the manager 108. As discussed previously, the dotted line 716 represents a callback between the listener 708 and the agent 123, where a callback handler is at the agent 123.

Generally, all callbacks can be bidirectional, where the arrow indicates the set-up direction of the callback. That is, the computing device or other entity which is responsible for creating the callback is on the tail of the arrow, and the entity which receives the callback and uses it for communicating results back through it is at the head of the arrow.

The first sequence of callbacks is: 1) from the user interface/workstation 102 to the MOM 104 (callback 802), and 2) from the MOM 104 to the manager 108 (call back 812). These two callbacks are for communicating from the manager up to the workstation on results and failsafe. The second sequence of callbacks is: 1) from the agent 123 to the manager 108 (callback 716), and 2) from the manager 108 to the MOM 104 (callback 814). These are failsafe and results callbacks that bring the result of dynamic instrumentation to the manager 108 and the user interface 102. The listeners 708 and 808 (and 828 in FIG. 8D, discussed below) provide "glue" by allowing the callbacks to synchronize. Callbacks 802, and callback 807 in FIG. 8B, discussed below, can be considered to be "parallel" callbacks, one for each item of instrumentation.

When temporary instrumentation is applied to an application in the application server 122, the timer 710 keeps track of a time period in which the temporary instrumentation is to be kept active. Further, the user interface 102 or the MOM 104 can use the callback 802 to determine if the connection 803 is lost. Similarly, the MOM 104 and the manager 108 can use the callbacks 812 and 814 to determine if the connection 805 is lost. The manager 108 or the agent 123 can use the callback 716 to determine if the connection 720 is lost.

Note that other connections can be established among the computing devices which do not involve temporary instrumentation.

FIG. 8B depicts an example implementation of the use of callbacks in the process of FIG. 3 involving a MOM, a manager and one agent, for two items of temporary instrumentation. This implementation adds to the implementation of FIG. 8A by providing additional callbacks and connections for an additional item of instrumentation which is used by the agent 123. In particular, an additional connection 811 is provided between the user interface 102 and MOM 104, an additional connection 809 is provided between the MOM 104 and the manager 108, and an additional connection 823 is provided between the manager 108 and the agent 123. Furthermore, the user interface 102 and the MOM 104 use an additional callback 807 to monitor the connection 811 relative to the additional item of instrumentation. The MOM 104 (via an additional listener process 842) and manager 108 use additional callbacks 844 and 846 to monitor the connection 809 relative to the additional item of instrumentation. The manager 108 and agent 123 use the callback 836 to monitor the connection 823 relative to the additional item of instrumentation. In the manager 108, an additional listener process 825 and associated timer process 827 are associated with the additional item of instrumentation.

The example can be extended to further items of instrumentation by using additional connections, listeners and callbacks.

FIG. 8C depicts an example implementation of the use of callbacks in the process of FIG. 3 involving a MOM, a manager and a two agents, for two items of temporary instrumentation involving one agent. This implementation modifies the implementation of FIG. 8B by providing the additional item of instrumentation to another agent, namely agent 125. In this case, a second connection 838 is established between the manager 108 and the application server 124 on which the agent process 125 runs. Moreover, a callback 840 is used by the manager 108 and the agent 125 to monitor the connection 838.

FIG. 8D depicts an example implementation of the use of callbacks in the process of FIG. 3 involving a MOM, two managers and two agents, for two items of temporary instrumentation involving two agents. This implementation modifies the implementation of FIG. 8A by providing an additional item of instrumentation to another agent, namely agent 143 which is associated with another manager, namely manager 114. In this case, a connection 894 is established between the MOM 104 and the manager 114, and a connection 848 is established between the process 832 of the manager 114 and the application server 142 on which the agent 143 runs. A timer 830 is associated with a listener 828. The MOM 104 and manager 114 use the callbacks 896 and 898 to monitor the connection 894, and the manager 114 and agent 143 use a callback 852 to monitor the connection 848.

Combinations of the implementations of FIGS. 8A-8D can also be used. The examples can be extended to further items of instrumentation by using additional connections, listeners and callbacks.

Figure 9:
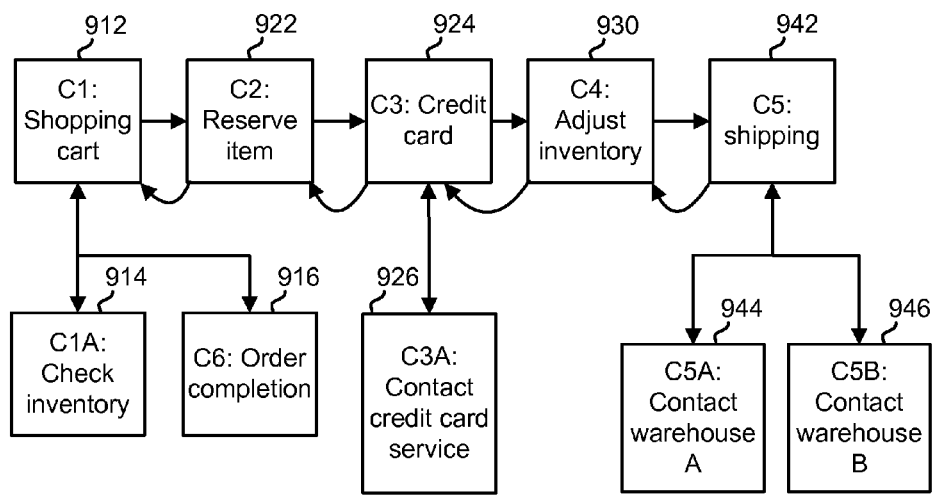
FIG. 9 depicts calling relationships of components in an execution path.

FIG. 9 depicts calling relationships of components in an execution path. Components are depicted in an application which may run on an application server such as depicted in FIG. 1. The sequence of components provided herein is an example of one possible type of execution path. Each component which is invoked can be considered part of an execution path. Note that, when an application is instrumented, typically only selected components are instrumented based on the developer's understanding of the application and selection of components which are expected to be of interest. Thus, many components which are not deemed to be of interest, at least initially, may be invoked in an application, but are not instrumented.

Component oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE, which can employ components such as a Java Server Page, an Enterprise Java Bean, a servlet, and a Java Database Connectivity component. However, other component oriented programming models may also be used, such as those using Microsoft .NET components. Moreover, the programming model need not be object oriented. In one approach, the components are considered to be methods.

The specific example shown refers to a web-based e-commerce application which allows users to order items. The components correspond to business logic or e-commerce steps in the application. In particular, a component C1 912 provides a shopping cart which allows a user to select an item to purchase and to enter information such as the payment method, e.g., type of credit card and credit card number, and the shipping information, e.g., the address to which the item is to be shipped and the method of shipping, e.g., ground delivery or overnight air delivery. C1 912 calls a component C1A 914 to check an inventory to determine if the selected item is in stock. Once it is determined that the selected item is in stock, C1 912 calls a component C2 922, which reserves the item so that it will not be sold to another user while the transaction is still pending. Once finished, C2 922 calls a component C3 924, which checks the user's credit card information to authorize and validate the purchase. This typically involves communicating with an external server that is managed by a credit card clearinghouse. For example, C3 924 can call a component C3A 926 which contacts a credit card service.

Once C3 924 successfully finishes, thereby approving the purchase, it calls a component C4 930 which adjusts an inventory by decrementing the quantity of the item which is purchased. C4 930 calls a component C3 942 which arranges for the item to be shipped, such as by contacting a warehouse, where a shipping label is printed and an operator is prompted to manually locate and pack the item. For example, C5 942 can call a component C5A 944, which contacts a warehouse A, and/or a component C5B 946, which contacts a warehouse B.

Once the components C2-C5 have executed, the execution path returns to C1 912, which calls an order completion component C6 916 to confirm the purchase to the user such as by providing an order confirmation number and a tracking number, e.g., in a confirmation e-mail or web page. The execution path can similarly return to C1 912 if the inventory is out of stock at C1A 914 or the credit card payment is unsuccessful at C3 924. In one possible implementation, C1 and C6 are Java Server Pages and C2-C5 are Enterprise JavaBeans.

Note that a first component can continue executing after calling another component, which begins executing, in an asynchronous, multi-thread or multi-process mode, or can temporarily pause until the called component has finished executing, in a synchronous, single-thread or single-process mode. For example, C1 912 can pause while the components C2-05 execute. Moreover, a given component may be invoked more than once during a transaction. For example, assume the user has purchased multiple items that are stored at different warehouses. In this case, C5 942 may execute repeatedly, contacting a different warehouse and/or warehouse department for each item.

Figure 10:
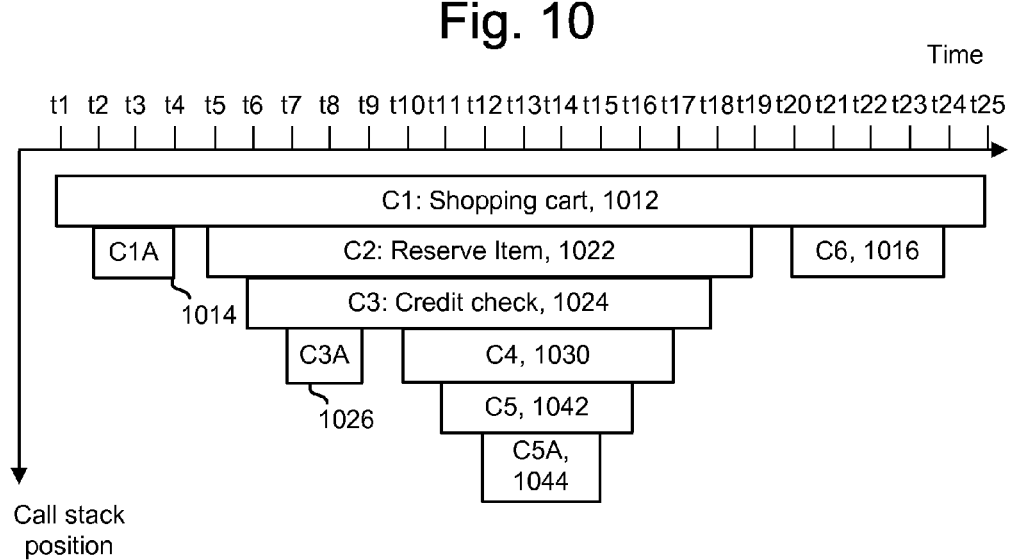
FIG. 10 depicts a call stack position vs. time graph based on the calling relationships of FIG. 9.

FIG. 10 depicts a call stack position vs. time graph based on the calling relationships of FIG. 9. The time increments are not necessarily evenly spaced. The representation, a transaction trace, is an example of the type of execution path information provided by one or more hosts. It can be a graphical representation which is provided as a report on a user interface, for instance, and represents performance data in the form of execution times of components such as methods. The execution path information can identify which methods of an application are invoked and the time in which they are invoked. The horizontal direction represents time, while the vertical direction indicates call stack depth or position. A call stack identifies methods which have been called or invoked during the execution of one or more programs or threads. An execution path will typically extend for a fraction of a second to a few seconds.

An example execution path includes the sequence: C1 (1012), C1A (1014), C1 (1012), C2 (1022), C3 (1024), C3A (1026), C3 (1024), C4 (1030), C5 (1042), C4 (1030), C3 (1024), C2 (1022), C1 (1012), C6 (1016) and C1 (1012). A host receives a request from a client and notes when C1 begins executing at t1. Each transition in the sequence is noted by the agent based on instrumentation. C1 calls C1A at t2. C1A completes executing at t4. C1 calls C2 at t5. C2 calls C3 at t6. C3 calls C3A at t7. C3A completes executing at t9. C3 calls C4 at t10. C4 calls C5 at t11. C5 completes executing at t16. C4 completes executing at t17. At t18, C3 completes executing. C2 completes executing at t19. C1 calls C6 at t20. C6 completes executing at t24. The host provides a response to the client, at which time C1 completes executing, at t25. The host periodically reports time and transaction data to the central manager.

Figure 11:
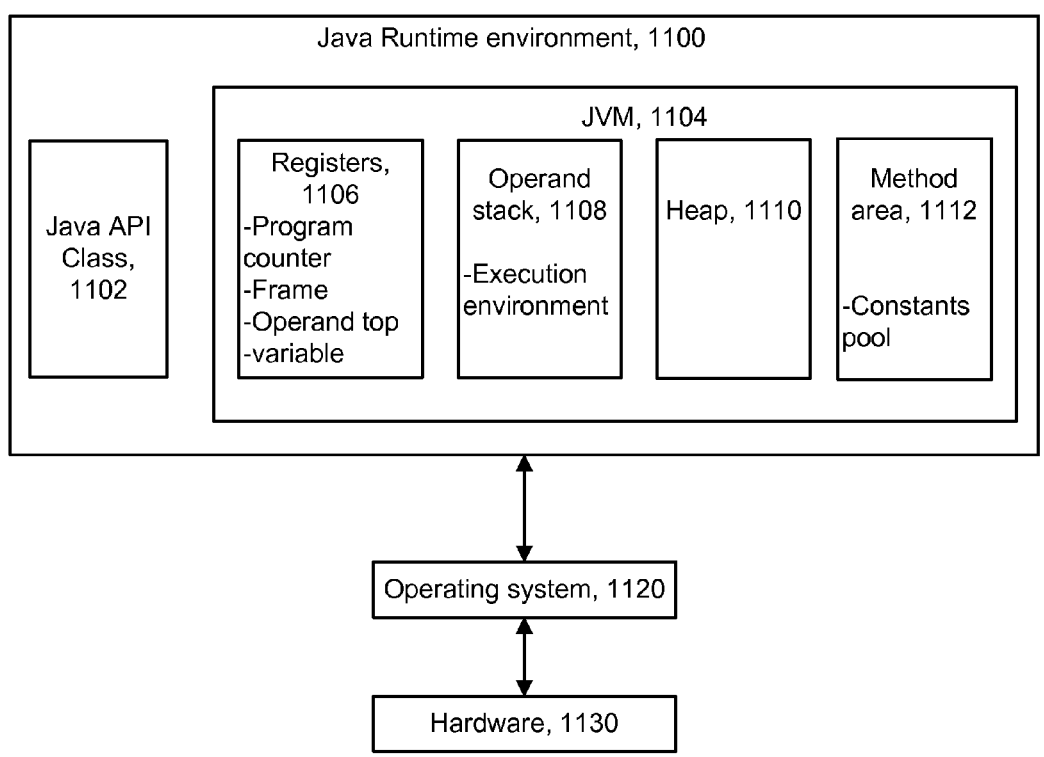
FIG. 11 depicts a JAVA runtime environment.

FIG. 11 depicts a JAVA runtime environment. The JAVA runtime environment 1100 is built on an operating system, 1120, which is built on hardware 1130. The JAVA runtime environment includes a number of virtual parts, including the JAVA API Class 1102 and a JVM 1104. The JVM includes registers 1106, an operand stack 1108, a heap 1110 and a method area 1112. The JVM processes a stream of byte codes as a sequence of instructions. A JVM instruction consists of an opcode specifying the operation to be performed, followed by zero or more operands embodying values to be operated upon. The operand stack 1108, heap 1110 and method area 1112 are within addressable memory. The size of an address is 32 bits, each memory location contains one byte, and each register stores one 32-bit address. The method area contains byte codes and is aligned on byte boundaries, while the operand stack and the heap are aligned on word (32-bit) boundaries.

The registers includes a program counter (pc), which keeps track of where in the memory it should be executing instructions. The program counter identifies the next byte code to be executed. The frame register contains a pointer to the execution environment of the current method in the operand stack. The operand top (optop) register contains a pointer to the top of the operand stack, and is used to evaluate arithmetic expressions. The variable (vars) register contains a pointer to local variables.

The operand stack supplies parameters to methods and operations and receives results back from them. All byte code instructions take operands from the stack, operate on them, and return results to the stack. The operand stack includes a stack frame of an executing method. The stack frame holds the state, e.g., local variables, and intermediate results of calculations, for a particular invocation of a method. Specifically, each JVM thread has a private NM stack, created at the same time as the thread. A JVM stack stores frames, holds local variables and partial results, and plays a part in method invocation and return. A frame is thus used to store data and partial results, as well as to perform dynamic linking, return values for methods, and dispatch exceptions. A new frame is created each time a method is invoked. A frame is destroyed when its method invocation completes, whether that completion is normal or abrupt (it throws an uncaught exception). Frames are allocated from the JVM stack of the thread creating the frame. Each frame has its own array of local variables, its own operand stack, and a reference to the runtime constant pool of the class of the current method.

The heap or memory allocation pool is garbage collected. The heap is the runtime data area from which memory for all class instances and arrays is allocated. The heap is created on virtual machine start-up, and heap storage for objects is reclaimed by an automatic storage management system known as a garbage collector. Specifically, each program running in the Java runtime environment has a garbage-collected heap assigned to it. Moreover, each class in the heap has a constant pool associated with it. Because constants do not change, they are usually created at compile time. Items in the constant pool encode all the names used by any method in a particular class. The class contains a count of how many constants exist, and an offset that specifies where a particular listing of constants begins within the class description.

The method area stores byte code instructions that are associated with methods in the compiled code, and a symbol table which the execution environment needs for dynamic linking Any debugging or additional information that might need to be associated with a method is stored in this area as well. The program counter always points to, e.g., contains the address of, some byte in the method area. The program counter is used to keep track of the thread of execution. After a byte code instruction has been executed, the program counter will contain the address of the next instruction to execute.

The method area is shared among all JVM threads, and stores per-class structures such as the runtime constant pool, field and method data, and the code for methods and constructors, including the special methods used in class and instance initialization and interface type initialization. The method area is created on virtual machine start-up. A runtime constant pool is a per-class or per-interface runtime representation of the constant pool table in a class file. It contains several kinds of constants, ranging from numeric literals known at compile time, to method and field references that must be resolved at run time. Each runtime constant pool is allocated from the JVM's method area. The runtime constant pool for a class or interface is constructed when the class or interface is created by the JVM.

Figure 12A:
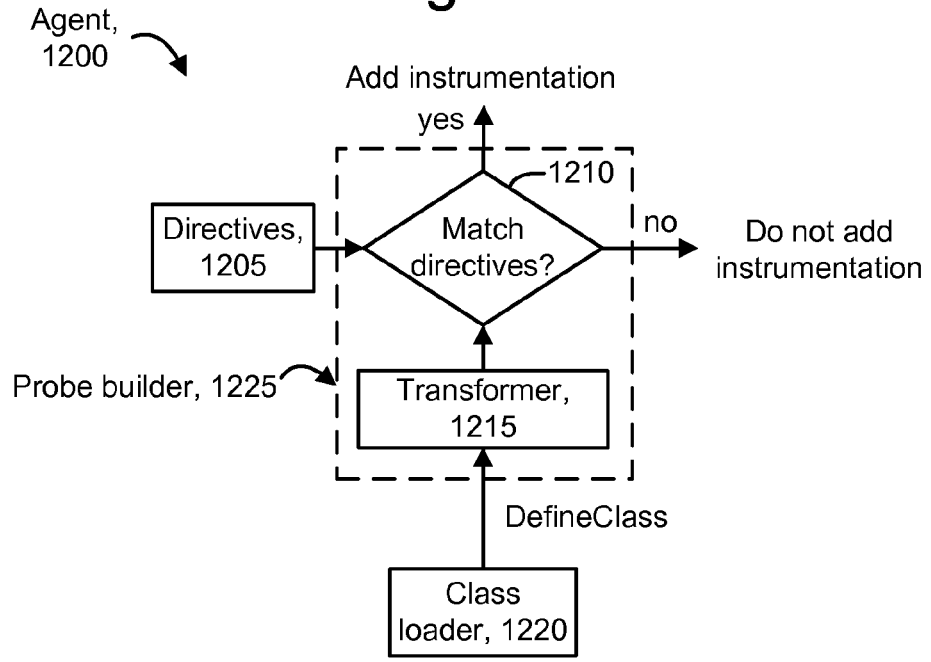
FIG. 12A depicts a JAVA-based example process flow for static instrumentation.

FIG. 12A depicts a JAVA-based example process flow for static instrumentation. The process may be implemented by an agent 1200, such as depicted in FIG. 1, in one possible approach. One approach to instrumentation involves providing static rules which determine which components, such as methods, are to be instrumented. The rules are accessed at the time the components are loaded into the application. In such an approach, a class loader 1220 is used to provide raw data bytes of an application byte code to a transformer 1215, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 1215 is thus software which can transform byte code to add instrumentation, such as by transforming classes. In one approach, the minimum unit of processing of the transformer 1215 is a class file and its byte array.

If the application byte code matches rules (directives) 1205 at a decision block 1210, the transformer 1215 adds probes in the form of tracer byte code. If the application byte code does not matches the rules 1205 at the decision block 1210, the transformer 1215 does not add instrumentation to the byte code. The transformer 1215 and the decision block 1210 may be considered to be part of a probe builder 1225.

In this implementation, the rules 1205 are a set of typically static rules that identify portions of the managed application which are to be instrumented. The rules are usually implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting.

For instance, a rule may indicate that all servlets should be instrumented since it is believed that at least some of the servlets may provide interesting data. In this case, the rules 1205 may indicate that all components that are subclasses of the JAVA class HttpServlet should be instrumented. HttpServlet is an abstract class from which all servlets depend. However, not all components can be instrumented, and there is a tension in that over-inclusive instrumentation results in excessive overhead costs and possibly impairing the operation of the application, while under-inclusive instrumentation results in the omission of important performance data.

Figure 12B:
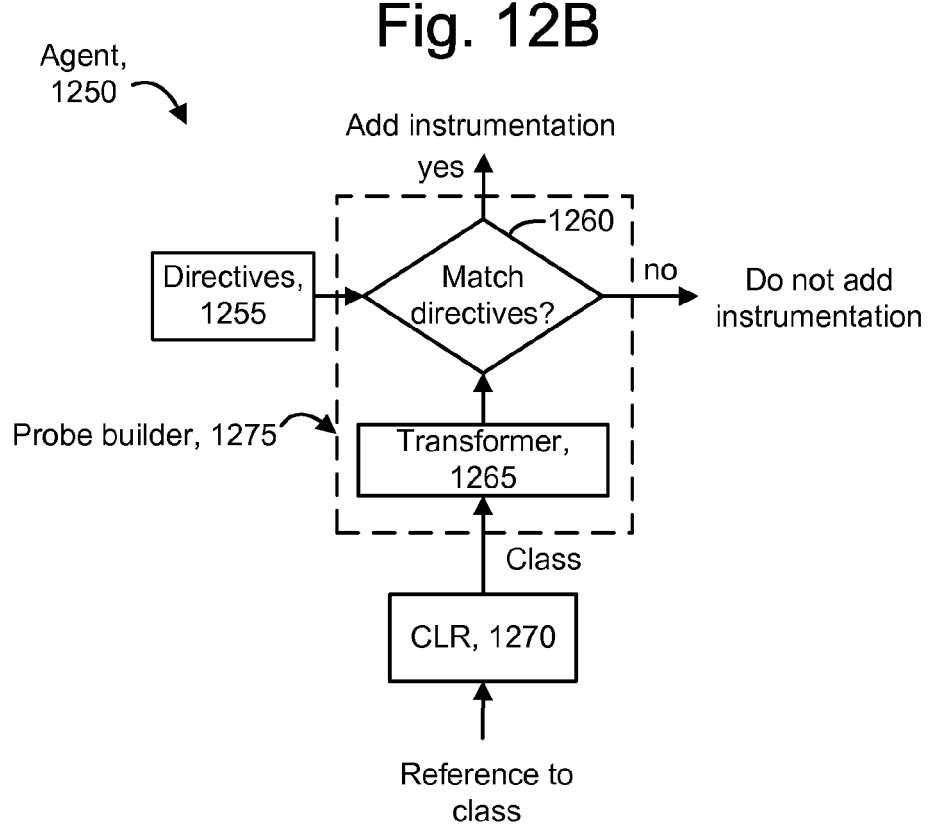
FIG. 12B depicts a .NET-based example process flow for static instrumentation.

FIG. 12B depicts a .NET-based example process flow for static instrumentation. In another possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, as other implementations are possible.

Here, the process may be implemented by an agent 1250, in one possible approach. In one possible scenario, some process in the .NET framework references a class by name, and the CLR 1270 finds the class, shows it to a transformer 1265 (if any) and uses the resultant CIL. In particular, if the class matches rules 1255 at a decision block 1260, instrumentation is added. If the class does not match the rules 1255 at the decision block 1260, instrumentation is not added. The transformer 1265 and the decision block 1260 may be considered to be part of a probe builder 1275.

Figure 14:
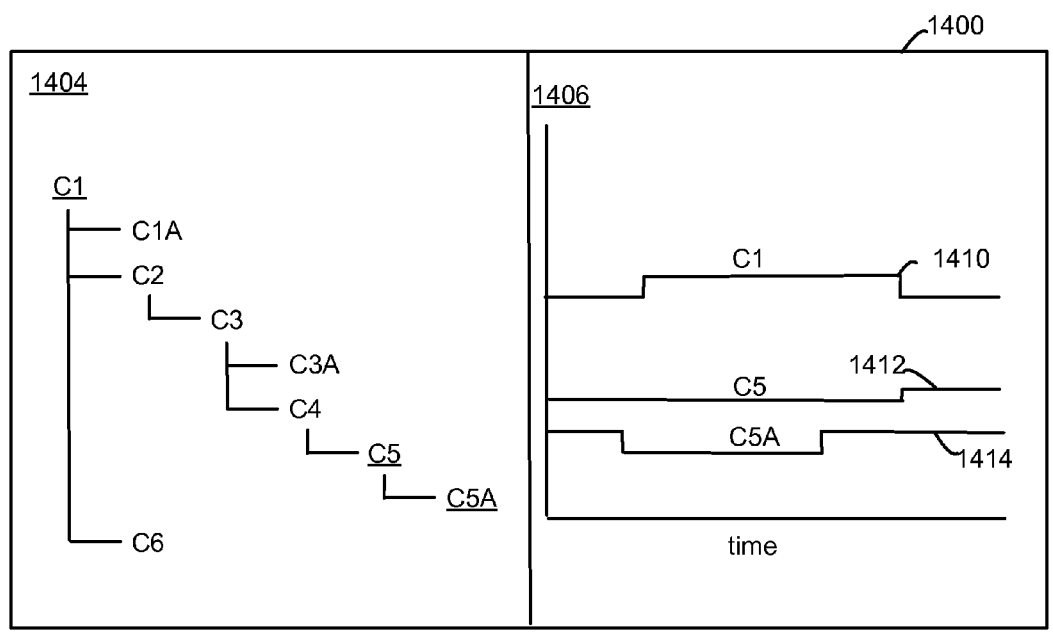
FIG. 14 depicts a user interface display which indicates a hierarchical relationship among components and corresponding performance data.

FIG. 13 depicts an example process flow for instrumenting software. In correspondence with FIG. 5A, a static list of components 1310 can be provided to a class loader 1302, which loads byte code for use by a transformer/probe builder 1300 to provide instrumented byte code. For instance, the method defineClass converts an array of bytes into an instance of class Class. Furthermore, a dynamic list of components 1306, such as methods or classes which are to be temporarily instrumented, can be instrumented. In one approach, a user interface 1308, such as depicted in FIG. 14, allows the user to designate components to be temporarily instrumented. The user can also modify the static list 1310. The user interface may be responsive to a performance monitor 1312, which monitors performance data which is flowing in from the existing instrumentation in the managed application and identify, for instance, the fact that some components are causing a problem in a transaction, such as taking too much time to execute. The performance data can be compared to lower and upper thresholds to determine whether it is out of range.

The dynamic list of components 1306 can include a dynamically updatable list of classes which should be instrumented. This list can change from time to time so that particular methods are instrumented for limited periods of time in which diagnosis is performed. The user interface 1308 may specify the time period, or a default time period may be used. Thus, a component can be redefined, so that it transitions, e.g., from not having temporary instrumentation at one point in time, to having temporary instrumentation at another point in time. It is also possible to provide different types or levels of temporary instrumentation. Redefining a component can thus involve transitions to different types of temporary instrumentation.

Instrumentation can yield many types of performance metrics/data, including an average execution or response time of a component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. Further, the data can identify a garbage collection heap size, a bandwidth metric indicating file and socket activity, a number of threads, system logs, exceptions, memory leaks and component interactions. The data can also identify which components are called by the instrumented component or which call the instrumented component. For instance, in a controller architecture, control flows in through a controller component, which has control over which components are executed next, and knows how often they are executing and how they are performing. The controller component can report, via instrumentation, on which un-instrumented components are being frequently invoked and therefore are perhaps of interest and should be redefined to add instrumentation.

Note that the dynamic list of components 1306, user interface 1308, static list of components 1310 and performance monitor 1312 can be provided at the same location or at different locations. For example, the user interface 1308 can be provided at a user interface computing device, the dynamic list of components 1306 and the static list of component 1310 can be provided at an agent of an application server, and the performance monitor 1312 may be associated with a manager computing, which receives performance data from one or more agents at one or more application servers.

The performance monitor 1312 provides an idea of what components are involved in a problem transaction and can determine whether these components could be causing, or are causing, issues, and identify this information on the user interface 1308.

The user interface 1308 allows a user to manually select which components are to be temporarily instrumented, for instance.

The static list of components 1310 may include classes or other components which are to be instrumented when the application begins running. This may be a baseline list of components which are expected to yield important data.

A component can be redefined in different ways according to whether the component has already been incorporated into the application at runtime. If a component is not already incorporated into the application, it can be incorporated normally by being loaded by the class loader 1302 such as in a JVM, in one possible implementation. In other implementations, such as those which use the .NET framework, a class loader is not used.

When a component is loaded, the transformer/probe builder 1300 instruments the component if instructed, e.g., in response to the user interface 1308, dynamic list of components 1306, static list of components 1310 and performance monitor 1312. A component which is already incorporated into the application, but is not instrumented, can be reincorporated into the application with instrumentation. For example, the component can be removed from the application and reloaded during the runtime without restarting the virtual machine. To achieve this, the JAVA redefineClass command is provided to the class loader 1302 with the component. The JAVA DEVELOPMENT KIT (JDK) version 1.5 or higher has a redefinition capability which uses this command This command redefines a supplied set of classes using supplied class files. It operates on a set in order to allow interlocked changes to more than one class at the same time. Moreover, if a redefined method has active stack frames, those active frames continue to run the byte codes of the original method, and the redefined method will be used on new invokes.

Redefining a component such as a class is analogous to restarting the virtual machine but only for that class. When a class is redefined, if the class is already in existing method stacks, it stays there. But, for every new method invocation, the new class is used. That is, once it is redefined, the new version is picked up.

When the transformer/probe builder 1300 receives the redefined component, it instruments the component, if instructed to do so. The transformer/probe builder 1300 could also add a specified type of instrumentation to the component.

After a component has been temporarily instrumented and reincorporated into the application, and the instrumentation is no longer need for diagnosis, the component can be reincorporated into the application again, but without temporary instrumentation. This removal of instrumentation can be based on a user command, a time out after a specified diagnosis period or other some other event. For instance, the performance monitor 1312 may determine that performance data of a component has been acceptable for a certain period of time or for number of invocations of the component. That is, the performance monitor 1312 may determine that performance data of at least one method of the instrumented methods no longer fails to meet a threshold performance level. In response, the performance monitor 1312 can issue a command, such as redefineClass, to remove the instrumentation.

The adding and removal of instrumentation can be done dynamically at runtime so that the virtual machine in which the byte code is executing does not have to be brought down, and data from the instrumented components can be accessed immediately (in the case of adding instrumentation).

FIG. 14 depicts a user interface display which indicates a hierarchical relationship among components and corresponding performance data. The user interface 1400 includes a display region 1404 which identifies the names of one or more instrumented components. The user can select one or more components in the display region 1404 to display performance data, e.g., a trace, for that component based on its instrumentation, in a display region 1406.

A checkbox or other interface mechanism can be provided to allow the user to specify classes/methods or other components to be temporarily instrumented. The user may indicate that instrumentation should be temporarily added to certain components based on, e.g., observations of which components are involved in errors or have themselves generated an error, prior troubleshooting experience and other factors.

The display region 1404 can be automatically populated with each of the components in the application using a hierarchical structure such as a tree which shows which components are under, or called by, another component. The display region 1406 depicts performance data such as transaction traces of the instrumented components based on the instrumentation, for selected ones of the components in the region 1404. For example, components C1, C5 and C5A are currently selected by a user, as indicated by the underlining of the component names, and corresponding performance data such as transaction traces is provided by curves 1410, 1412 and 1414 in region 1406. The region 1406 can be populated with performance data provided from an agent to a manager.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method, comprising:
at an application server, establishing a persistent connection between a socket of the application server and a socket of a computing device;
receiving a request at the application server to add temporary dynamic instrumentation to an application at the application server, the request is received from a computing device via the respective connection;
with the request to add the temporary dynamic instrumentation, receiving a request to establish a callback to the computing device;
in response to the request to add the temporary dynamic instrumentation, adding the temporary dynamic instrumentation to the application during a runtime of the application;
in response to the request to establish the callback, monitoring the socket of the application server to determine if the persistent connection is unexpectedly lost, the monitoring is performed by code at the application server; and
if the callback determines that the persistent connection is unexpectedly lost, restoring the application to a state which does not comprise the temporary dynamic instrumentation, wherein the callback determines that the persistent connection is unexpectedly lost by determining that the socket of the application server generates an event indicating that the persistent connection is unexpectedly lost.

2. The computer-implemented method of claim 1, wherein:
the request to add the temporary dynamic instrumentation comprises a directive to add the temporary dynamic instrumentation to a class of the application; and
the temporary dynamic instrumentation is added to the application by redefining the class of the application.

3. The computer-implemented method of claim 1, wherein:
the callback automatically determines that the persistent connection is unexpectedly lost, and the application is automatically, without human intervention, restored to the state which does not comprise the temporary dynamic instrumentation.

4. The computer-implemented method of claim 1, wherein:
the state to which the application is restored comprises static instrumentation but not dynamic instrumentation.

5. The computer-implemented method of claim 1, further comprising:
maintaining a record of directives, the directives identify classes of the application to which associated instrumentation was added before the temporary dynamic instrumentation was added, wherein the restoring comprises loading un-instrumented byte code of the application, and adding the associated instrumentation to the classes identified by the directives in the un-instrumented byte code.

6. The computer-implemented method of claim 5, wherein:
the un-instrumented byte code of the application is accessed from a .JAR file.

7. The computer-implemented method of claim 1, further comprising:
if the persistent connection is not unexpectedly lost, receiving a request from the computing device, upon expiration of a timer at the computing device, to restore the application to a state which existed before the temporary dynamic instrumentation was added.

8. The computer-implemented method of claim 1, further comprising:
if the persistent connection is not unexpectedly lost, receiving a request from the computing device, upon expiration of a timer at the computing device, to terminate the callback to the computing device.

9. The computer-implemented method of claim 7, further comprising:
in response to the request to restore the application, restoring the application to the state which existed before the temporary dynamic instrumentation was added, where the state which existed before the temporary dynamic instrumentation was added comprises instrumentation other than the temporary dynamic instrumentation.

10. The computer-implemented method of claim 8, further comprising:
in response to the request to terminate the callback to the computing device, terminating the callback to the computing device, and restoring the application to a state which existed before the temporary dynamic instrumentation was added, where the state which existed before the temporary dynamic instrumentation was added comprises instrumentation other than the temporary dynamic instrumentation.

11. A computer-implemented method, comprising:
   receiving a request at a first computing device from a second computing device, the request identifies an application server and comprises a directive for adding temporary dynamic instrumentation to an application at the application server;
   in response to the request, implementing a timer, establishing a first persistent connection, which is between a socket of the first computing device and a socket of the application server, and providing, from the first computing device to the application server via the first persistent connection, the directive to add the temporary dynamic instrumentation to the application, and a request to implement a callback to the first computing device, the callback monitors the socket of the application server to determine if the first persistent connection is unexpectedly lost, wherein the callback determines if the first persistent connection is unexpectedly lost by determining if the socket of the application server generates an event indicating that the persistent connection is unexpectedly lost; and
   upon expiration of the timer, if the first persistent connection is not unexpectedly lost, providing a request to the application server via the first persistent connection to restore the application to a state which existed before the temporary dynamic instrumentation was added.

12. The computer-implemented method of claim 11, further comprising:
   upon expiration of the timer, if the first persistent connection is not unexpectedly lost, providing a request to the application server via the first persistent connection to terminate the callback to the first computing device.

13. The computer-implemented method of claim 11, further comprising:
   at the first computing device, establishing a second persistent connection, which is between a socket of the first computing device and a socket of the second computing device, wherein the request received at the first computing device from the second computing device comprises a request to implement a callback to the second computing device via the second persistent connection, and the callback to the second computing device monitors the socket of the first computing device to determine if the second persistent connection is unexpectedly lost; and
   upon expiration of the timer, terminating the callback to the second computing.

14. The computer-implemented method of claim 11, further comprising:
   at the first computing device, establishing a second persistent connection, which is between a socket of the first computing device and a socket of the second computing device, wherein the request received at the first computing device from the second computing device comprises a request to implement a callback to the second computing device via the second persistent connection, and the callback to the second computing device monitors the socket of the first computing device to determine if the second persistent connection is unexpectedly lost; and at the first computing device, listening to the first persistent connection to determine if the first persistent connection is unexpectedly lost, and in response to determining that the first persistent connection is unexpectedly lost, terminating the callback to the second computing device.

15. A computer-implemented method, comprising:
   receiving one request at an application server to add temporary dynamic instrumentation to an application at the application server, the one request is received from a computing device via one connection between the computing device and the application server;
   in response to the one request, adding the temporary dynamic instrumentation to the application during a runtime of the application, and implementing one callback to the computing device via the one connection, the one callback determines if the one connection is unexpectedly lost using code which monitors the one connection;
   after the temporary dynamic instrumentation is added to the application, receiving an additional request to add additional temporary dynamic instrumentation to the application, the additional request is received at the application server from the computing device via another connection between the computing device and the application server;
   in response to the additional request, adding the additional temporary dynamic instrumentation to the application during the runtime of the application, and implementing another callback to the computing device, the another callback determines if the another connection is unexpectedly lost; and
   in response to the another callback determining that the another connection is unexpectedly lost, and the one callback determining that the one connection is not unexpectedly lost, restoring the application to a state which does not comprise the additional temporary dynamic instrumentation, but which does comprise the temporary dynamic instrumentation of the one request.

16. The computer-implemented method of claim 15 wherein:
   the one connection is made via a socket at the application server; and
   the one callback determines that the one connection is not unexpectedly lost by determining that the socket does not generate an event indicating that the one connection is unexpectedly lost.

17. The computer-implemented method of claim 15, wherein:
   the another connection is made via a socket at the application server; and
   the another callback determines that the another connection is unexpectedly lost by determining that the socket generates an event indicating that the another connection is unexpectedly lost.

* * * * *